(12) United States Patent
Jung et al.

(10) Patent No.: US 8,253,821 B2
(45) Date of Patent: Aug. 28, 2012

(54) DEGRADATION/PRESERVATION MANAGEMENT OF CAPTURED DATA

(75) Inventors: Edward K. Y. Jung, Bellevue, WA (US);
Royce A. Levien, Lexington, MA (US);
Robert W. Lord, Seattle, WA (US);
Mark A. Malamud, Seattle, WA (US);
John D. Rinaldo, Jr., Bellevue, WA (US)

(73) Assignee: The Invention Science Fund I, LLC, Bellevue, WA (US)

( * ) Notice: Subject to any disclaimer, the term of this patent is extended or adjusted under 35 U.S.C. 154(b) by 967 days.

(21) Appl. No.: 11/508,554

(22) Filed: Aug. 22, 2006

(65) Prior Publication Data
US 2007/0097215 A1    May 3, 2007

Related U.S. Application Data

(63) Continuation-in-part of application No. 11/263,587, filed on Oct. 31, 2005, now Pat. No. 7,872,675, and a continuation-in-part of application No. 11/264,701, filed on Nov. 1, 2005, and a continuation-in-part of application No. 11/364,496, filed on Feb. 28, 2006, and a continuation-in-part of application No. 11/376,627, filed on Mar. 15, 2006, now abandoned, and a continuation-in-part of application No. 11/396,279, filed on Mar. 31, 2006, now abandoned, and a continuation-in-part of application No. 11/413,271, filed on Apr. 28, 2006, now abandoned, and a continuation-in-part of application No. 11/434,568, filed on May 15, 2006.

(51) Int. Cl.
*H04N 9/73* (2006.01)
*H04N 5/76* (2006.01)

(52) U.S. Cl. .................................... 348/231.1; 386/295
(58) Field of Classification Search .................. 348/231, 348/1, 231.2, 231.4, 207.1, 207.11, 211.12, 348/231.3, 211.11, 207.99, 231.99–231.5, 348/231.9; 386/125, 295
See application file for complete search history.

(56) References Cited

U.S. PATENT DOCUMENTS 4,249,218 A    2/1981   Davis et al.
(Continued)

FOREIGN PATENT DOCUMENTS

JP    H09-018762    1/1997
(Continued)

OTHER PUBLICATIONS

U.S. Appl. No. 12/290,538, Jung et al.
(Continued)

*Primary Examiner* — Tuan Ho
*Assistant Examiner* — Ahmed A Berhan

(57) ABSTRACT

In one aspect, a method related to data management includes but is not limited to accepting input for designation of a first portion of a data stream for retention at a first resolution, wherein the data stream represents video and/or audio information: and accepting input for designation of a second portion of the data stream for retention at a second resolution, wherein the second resolution is less than the first resolution, and wherein the retention of the second portion of the data stream at the second resolution is to be performed if a condition is met. In addition, other method aspects are described in the claims, drawings, and/or text forming a part of the present application. Related systems are also disclosed.

35 Claims, 23 Drawing Sheets

U.S. PATENT DOCUMENTS

| | | |
|---|---|---|
| 5,164,831 A | 11/1992 | Kuchta et al. |
| 5,388,197 A | 2/1995 | Rayner |
| 5,467,288 A | 11/1995 | Faciano et al. |
| 5,485,553 A | 1/1996 | Kovalick et al. |
| 5,485,554 A | 1/1996 | Lowitz et al. |
| 5,546,145 A | 8/1996 | Bernardi et al. |
| 5,629,778 A | 5/1997 | Reuman |
| 5,659,662 A | 8/1997 | Wilcox et al. |
| 5,675,789 A | 10/1997 | Ishii et al. |
| 5,689,442 A | 11/1997 | Swanson et al. |
| 5,701,163 A | 12/1997 | Richards et al. |
| 5,738,522 A | 4/1998 | Sussholz et al. |
| 5,764,800 A | 6/1998 | Yamagata |
| 5,818,977 A | 10/1998 | Tansley |
| 5,825,506 A | 10/1998 | Bednar et al. |
| 5,892,509 A | 4/1999 | Jakobs et al. |
| 5,917,958 A | 6/1999 | Nunally et al. |
| 5,926,605 A | 7/1999 | Ichimura |
| 5,956,081 A | 9/1999 | Katz et al. |
| 5,959,622 A | 9/1999 | Greer et al. |
| 5,995,095 A | 11/1999 | Ratakonda |
| 6,011,901 A | 1/2000 | Kirsten |
| 6,107,918 A | 8/2000 | Klein et al. |
| 6,122,003 A | 9/2000 | Anderson |
| 6,122,411 A * | 9/2000 | Shen et al. .................... 382/299 |
| 6,134,345 A | 10/2000 | Berman et al. |
| 6,157,406 A | 12/2000 | Iura et al. |
| 6,157,935 A | 12/2000 | Tran et al. |
| 6,167,350 A | 12/2000 | Hiramatsu et al. |
| 6,177,958 B1 | 1/2001 | Anderson |
| 6,198,526 B1 | 3/2001 | Ohtsuka |
| 6,229,565 B1 | 5/2001 | Bobry |
| 6,229,850 B1 | 5/2001 | Linzer et al. |
| 6,275,260 B1 | 8/2001 | Anderson |
| 6,359,649 B1 | 3/2002 | Suzuki |
| 6,384,862 B1 | 5/2002 | Brusewitz et al. |
| 6,445,822 B1 | 9/2002 | Crill et al. |
| 6,446,095 B1 | 9/2002 | Mukai |
| 6,476,858 B1 | 11/2002 | Ramirez Diaz et al. |
| 6,493,028 B1 | 12/2002 | Anderson et al. |
| 6,499,016 B1 | 12/2002 | Anderson |
| 6,512,541 B2 | 1/2003 | Dunton et al. |
| 6,516,154 B1 | 2/2003 | Parulski et al. |
| 6,519,612 B1 | 2/2003 | Howard et al. |
| 6,522,418 B2 | 2/2003 | Yokomizo et al. |
| 6,539,169 B1 | 3/2003 | Tsubaki et al. |
| 6,542,183 B1 | 4/2003 | DeAngelis et al. |
| 6,546,189 B1 | 4/2003 | Koda |
| 6,567,122 B1 | 5/2003 | Anderson et al. |
| 6,573,927 B2 | 6/2003 | Parulski et al. |
| 6,577,336 B2 | 6/2003 | Safai |
| 6,633,309 B2 | 10/2003 | Lau et al. |
| 6,646,676 B1 | 11/2003 | DaGraca et al. |
| 6,657,667 B1 | 12/2003 | Anderson |
| 6,678,413 B1 | 1/2004 | Liang et al. |
| 6,698,021 B1 | 2/2004 | Amini et al. |
| 6,701,845 B2 | 3/2004 | Ohmura |
| 6,710,809 B1 | 3/2004 | Niikawa |
| 6,714,192 B1 | 3/2004 | Torres |
| 6,735,253 B1 | 5/2004 | Chang et al. |
| 6,738,155 B1 | 5/2004 | Rosenlund et al. |
| 6,757,008 B1 | 6/2004 | Smith |
| 6,762,791 B1 | 7/2004 | Schuetzle |
| 6,816,071 B2 | 11/2004 | Conti |
| 6,823,092 B1 | 11/2004 | Sato |
| 6,871,010 B1 | 3/2005 | Taguchi et al. |
| 6,885,395 B1 * | 4/2005 | Rabbani et al. ............. 348/231.1 |
| 6,898,173 B2 | 5/2005 | McPherson et al. |
| 6,947,075 B1 | 9/2005 | Niikawa |
| 6,987,528 B1 | 1/2006 | Nagahisa et al. |
| 6,999,626 B2 | 2/2006 | Andrew |
| 7,015,954 B1 | 3/2006 | Foote et al. |
| 7,046,273 B2 | 5/2006 | Suzuki |
| 7,046,292 B2 | 5/2006 | Ziemkowski |
| 7,068,316 B1 | 6/2006 | Pine |
| 7,075,567 B2 | 7/2006 | Hunter et al. |
| 7,079,176 B1 | 7/2006 | Freeman et al. |
| 7,110,027 B2 | 9/2006 | Wyman |
| 7,227,569 B2 | 6/2007 | Maruya |
| 7,236,690 B2 | 6/2007 | Matsukawa |
| 7,257,317 B2 | 8/2007 | Ohnishi |
| 7,333,134 B2 | 2/2008 | Miyamoto |
| 7,340,766 B2 | 3/2008 | Nagao et al. |
| 7,362,968 B2 | 4/2008 | Kim |
| 7,366,979 B2 | 4/2008 | Spielberg et al. |
| 7,379,116 B2 | 5/2008 | Okamura |
| 7,383,508 B2 | 6/2008 | Toyama et al. |
| 7,444,593 B1 | 10/2008 | Reid |
| 7,448,063 B2 | 11/2008 | Freeman et al. |
| 7,504,942 B2 | 3/2009 | Marman |
| 7,535,491 B1 | 5/2009 | Kumagai et al. |
| 7,551,787 B2 * | 6/2009 | Marks ........................... 382/239 |
| 7,576,770 B2 | 8/2009 | Metzger et al. |
| 7,587,674 B2 | 9/2009 | Broeksteeg |
| 7,626,733 B2 * | 12/2009 | Kodama et al. ........... 358/426.07 |
| 7,733,371 B1 | 6/2010 | Monroe |
| 7,751,628 B1 | 7/2010 | Reisman |
| 7,904,814 B2 | 3/2011 | Errico et al. |
| 2001/0028398 A1 | 10/2001 | Takahashi |
| 2001/0029521 A1 | 10/2001 | Matsuda et al. |
| 2001/0033333 A1 | 10/2001 | Suzuki et al. |
| 2001/0042043 A1 | 11/2001 | Shear et al. |
| 2001/0046199 A1 | 11/2001 | McPherson et al. |
| 2001/0050875 A1 | 12/2001 | Kahn et al. |
| 2002/0028026 A1 | 3/2002 | Chen et al. |
| 2002/0030749 A1 | 3/2002 | Nakamura et al. |
| 2002/0054232 A1 | 5/2002 | Inagaki |
| 2002/0090217 A1 | 7/2002 | Limor et al. |
| 2002/0145622 A1 | 10/2002 | Kauffman et al. |
| 2002/0171737 A1 | 11/2002 | Tullis |
| 2002/0176016 A1 | 11/2002 | Misawa et al. |
| 2002/0191952 A1 | 12/2002 | Fiore et al. |
| 2002/0196344 A1 | 12/2002 | McIntyre et al. |
| 2002/0197067 A1 | 12/2002 | Ohnishi |
| 2003/0007078 A1 * | 1/2003 | Feldis, III ................... 348/231.6 |
| 2003/0018802 A1 | 1/2003 | Romanik et al. |
| 2003/0020814 A1 | 1/2003 | Ono |
| 2003/0021455 A1 | 1/2003 | Dixon et al. |
| 2003/0026596 A1 * | 2/2003 | Betti et al. ..................... 386/109 |
| 2003/0069898 A1 | 4/2003 | Christodoulou et al. |
| 2003/0072491 A1 | 4/2003 | Sirivara et al. |
| 2003/0080878 A1 | 5/2003 | Kirmuss |
| 2003/0081140 A1 | 5/2003 | Furukawa |
| 2003/0095191 A1 | 5/2003 | Saito |
| 2003/0103144 A1 | 6/2003 | Sesek et al. |
| 2003/0112261 A1 | 6/2003 | Zhang |
| 2003/0112354 A1 | 6/2003 | Ortiz et al. |
| 2003/0113014 A1 | 6/2003 | Katoh |
| 2003/0117642 A1 | 6/2003 | Haraguchi |
| 2003/0131002 A1 | 7/2003 | Gennetten et al. |
| 2003/0152263 A1 | 8/2003 | Kawano et al. |
| 2003/0160870 A1 | 8/2003 | Ziemkowski |
| 2003/0206232 A1 | 11/2003 | Suzuki et al. |
| 2003/0222998 A1 | 12/2003 | Yamauchi et al. |
| 2003/0236674 A1 | 12/2003 | Henry, Jr. |
| 2004/0017333 A1 | 1/2004 | Cooper et al. |
| 2004/0042679 A1 | 3/2004 | Yamada |
| 2004/0066968 A1 | 4/2004 | Glickman |
| 2004/0070678 A1 | 4/2004 | Toyama et al. |
| 2004/0075750 A1 | 4/2004 | Bateman |
| 2004/0085456 A1 | 5/2004 | Kwag et al. |
| 2004/0095474 A1 | 5/2004 | Matsufune |
| 2004/0120562 A1 | 6/2004 | Hays et al. |
| 2004/0123131 A1 | 6/2004 | Zacks et al. |
| 2004/0131282 A1 | 7/2004 | Yoshida et al. |
| 2004/0174454 A1 | 9/2004 | Okamura |
| 2004/0179121 A1 | 9/2004 | Silverstein |
| 2004/0183903 A1 | 9/2004 | Pedersen |
| 2004/0201690 A1 | 10/2004 | Bryant et al. |
| 2004/0201709 A1 | 10/2004 | McIntyre et al. |
| 2004/0216173 A1 | 10/2004 | Horoszowski et al. |
| 2004/0218894 A1 | 11/2004 | Harville et al. |
| 2004/0239958 A1 | 12/2004 | Nagata et al. |
| 2004/0252193 A1 | 12/2004 | Higgins |
| 2004/0257462 A1 | 12/2004 | Goris et al. |
| 2004/0263658 A1 | 12/2004 | Cozier et al. |
| 2005/0013602 A1 | 1/2005 | Ogawa |

| | | | |
|---|---|---|---|
| 2005/0018053 A1 | 1/2005 | Suga et al. | |
| 2005/0036033 A1 | 2/2005 | Imai | |
| 2005/0046707 A1 | 3/2005 | Takane | |
| 2005/0057687 A1 | 3/2005 | Irani et al. | |
| 2005/0103863 A1 | 5/2005 | Zhu et al. | |
| 2005/0158015 A1 | 7/2005 | Nakayama et al. | |
| 2005/0169367 A1 | 8/2005 | Venetianer et al. | |
| 2005/0187901 A1 | 8/2005 | Maritzen et al. | |
| 2005/0193421 A1 | 9/2005 | Cragun | |
| 2005/0212912 A1 | 9/2005 | Huster | |
| 2005/0212950 A1 | 9/2005 | Kanai | |
| 2005/0231625 A1 | 10/2005 | Parulski et al. | |
| 2005/0262097 A1 | 11/2005 | Sim-Tang et al. | |
| 2005/0271251 A1* | 12/2005 | Russell et al. | 382/103 |
| 2006/0023066 A1 | 2/2006 | Li et al. | |
| 2006/0044398 A1 | 3/2006 | Foong et al. | |
| 2006/0044416 A1 | 3/2006 | Miyazaki et al. | |
| 2006/0044444 A1 | 3/2006 | Okamoto et al. | |
| 2006/0092291 A1 | 5/2006 | Bodie | |
| 2006/0098112 A1 | 5/2006 | Kelly | |
| 2006/0109349 A1 | 5/2006 | Takashima | |
| 2006/0125922 A1 | 6/2006 | Albert et al. | |
| 2006/0143665 A1 | 6/2006 | Meek et al. | |
| 2006/0173756 A1 | 8/2006 | Benight | |
| 2006/0192887 A1 | 8/2006 | Miyamaki et al. | |
| 2006/0203099 A1 | 9/2006 | Omata | |
| 2006/0268117 A1 | 11/2006 | Loui et al. | |
| 2007/0100860 A1 | 5/2007 | Jung et al. | |
| 2008/0023232 A1 | 1/2008 | Morag et al. | |

FOREIGN PATENT DOCUMENTS

| | | |
|---|---|---|
| JP | 10023303 A | 1/1998 |
| JP | 2001-309236 A | 11/2001 |
| JP | 2002-094862 A | 3/2002 |
| JP | 2003-009044 A | 1/2003 |
| WO | WO 2005/078597 A1 | 8/2005 |

OTHER PUBLICATIONS

U.S. Appl. No. 12/284,202, Jung et al.
U.S. Appl. No. 12/283,420, Jung et al.
"Kodak Unveils World's First Dual-Lens Digital Camera; Combines Ultra-Wide Angle and Zoom Lenses in Compact Body"; Kodak; Bearing a date of Jan. 2, 2006; pp. 1-2; located at: http://www.kodak.com/eknec/PageQuerier.jhtml?pq-path=2709&pq-locale=en_US&gpcid=0900688a80465805; printed on Mar. 7, 2006.
Reichmann, Michael; "Understanding Raw Files"; Luminous-landscape.com; Printed on Oct. 25, 2005; pp. 1-9; located at: http://www.luminous-landscape.com/tutorials/understanding-series/u-raw-files.shtml.
"Sanyo Xacit VPC-HD1 5.1MP MPEG4 High Definition Camcorder w/10x Optical Zoom: Product Description"; Bearing dates of 1996-2006; pp. 1-5; located at: http://www.amazon.com/gp/product/product-description/B000E0E6YC/ref=dp_nav_2/002-0210595-1654445?%5Fencoding=UTF8&n=502394&s=photo; printed on Mar. 7, 2006; Amazon.com.
"What is storage device?—A Word Definition From the Webopedia Computer Dictionary"; Webopedia.com; Bearing dates of Oct. 30, 2001 and 2005, printed on Oct. 25, 2005; pp. 1-4; located at: http://www.webopedia.com/TERM/S/storage_device.htm.
European Search Report; European App. No. EP 07751674.8; May 27, 2009; pp. 1-5.
"Federal Standard 1037C Telecommunications: Glossary of Telecommunication Terms"; Bearing a date of Aug. 7, 1996; printed on May 30, 2009; total of 8 pages; General Services Administration Information Technology Service, Federal Standard 1037C (as provided by examiner).
"Merriam-Webster Collegiate Dictionary"; Bearing dates of 1993 and 1997; total of 3 pages; Merriam-Webster, Inc., Tenth Edition; Springfield, Massachusetts, USA (as provided by examiner).
PCT International Search Report; International App. No. PCT/US06/42728; Jul. 7, 2008; pp. 1-2.
PCT International Search Report; International App. No. PCT/US06/23048; Jul. 18, 2008; pp. 1-2.
U.S. Appl. No. 11/591,435, Jung et al.
U.S. Appl. No. 11/541,382, Jung et al.
U.S. Appl. No. 11/526,886, Jung et al.
U.S. Appl. No. 11/510,139, Jung et al.
U.S. Appl. No. 11/506,760, Jung et al.
U.S. Appl. No. 11/475,516, Levien et al.
U.S. Appl. No. 11/440,409, Levien et al.
U.S. Appl. No. 11/437,284, Levien et al.
PCT International Search Report; International App. No. PCT/US06/42840; pp. 1-2; Sep. 26, 2007.
PCT International Search Report; International App. No. PCT/US06/42584; pp. 1-2; Sep. 28, 2007.
PCT International Search Report; International App. No. PCT/US 07/08341; Feb. 7, 2008; pp. 1-2.
PCT International Search Report; International App. No. PCT/US 07/08342; Feb. 7, 2008; pp. 1-2.
PCT International Search Report; International App. No. PCT/US 06/42734; Mar. 26, 2008; pp. 1-2.
PCT International Search Report; International App. No. PCT/US06/42699; dated Sep. 18, 2008; pp. 1-5.
PCT International Search Report; International App. No. PCT/US06/42841; dated Sep. 15, 2008; pp. 1-2.
PCT International Search Report; International App. No. PCT/US07/04934; dated Sep. 12, 2008; pp. 1-2.
U.S. Appl. No. 13/135,255, Jung, et al.

* cited by examiner

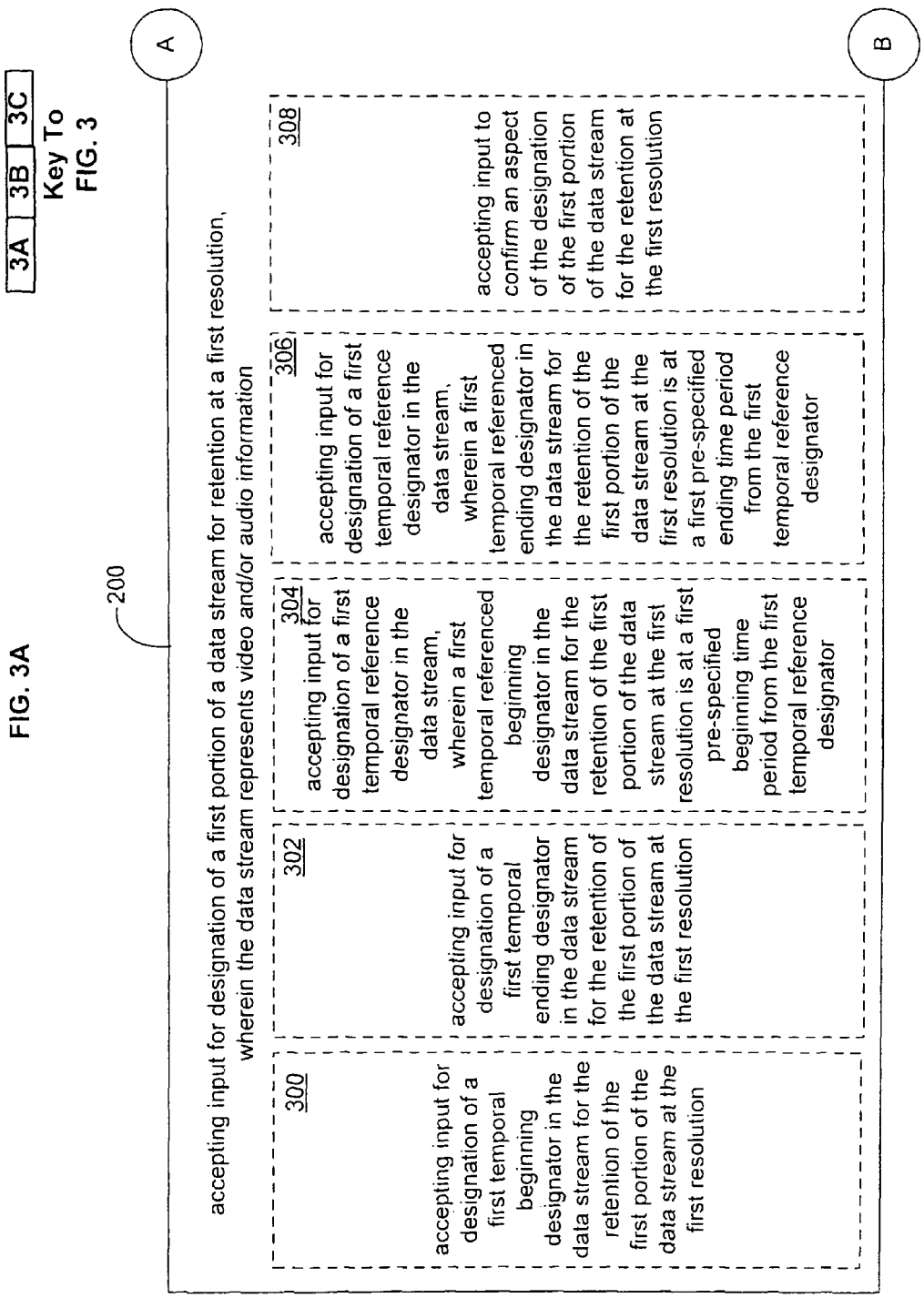

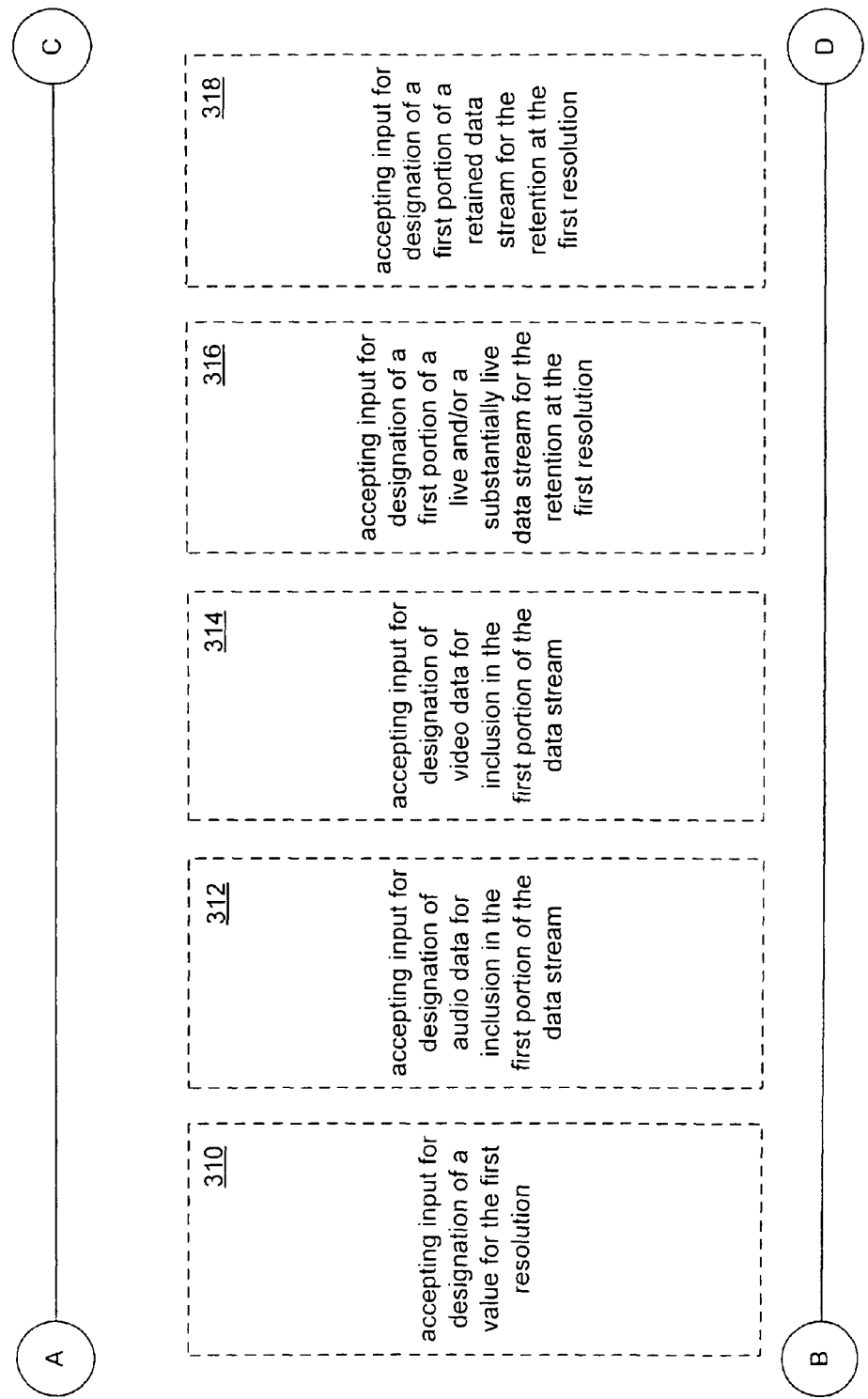

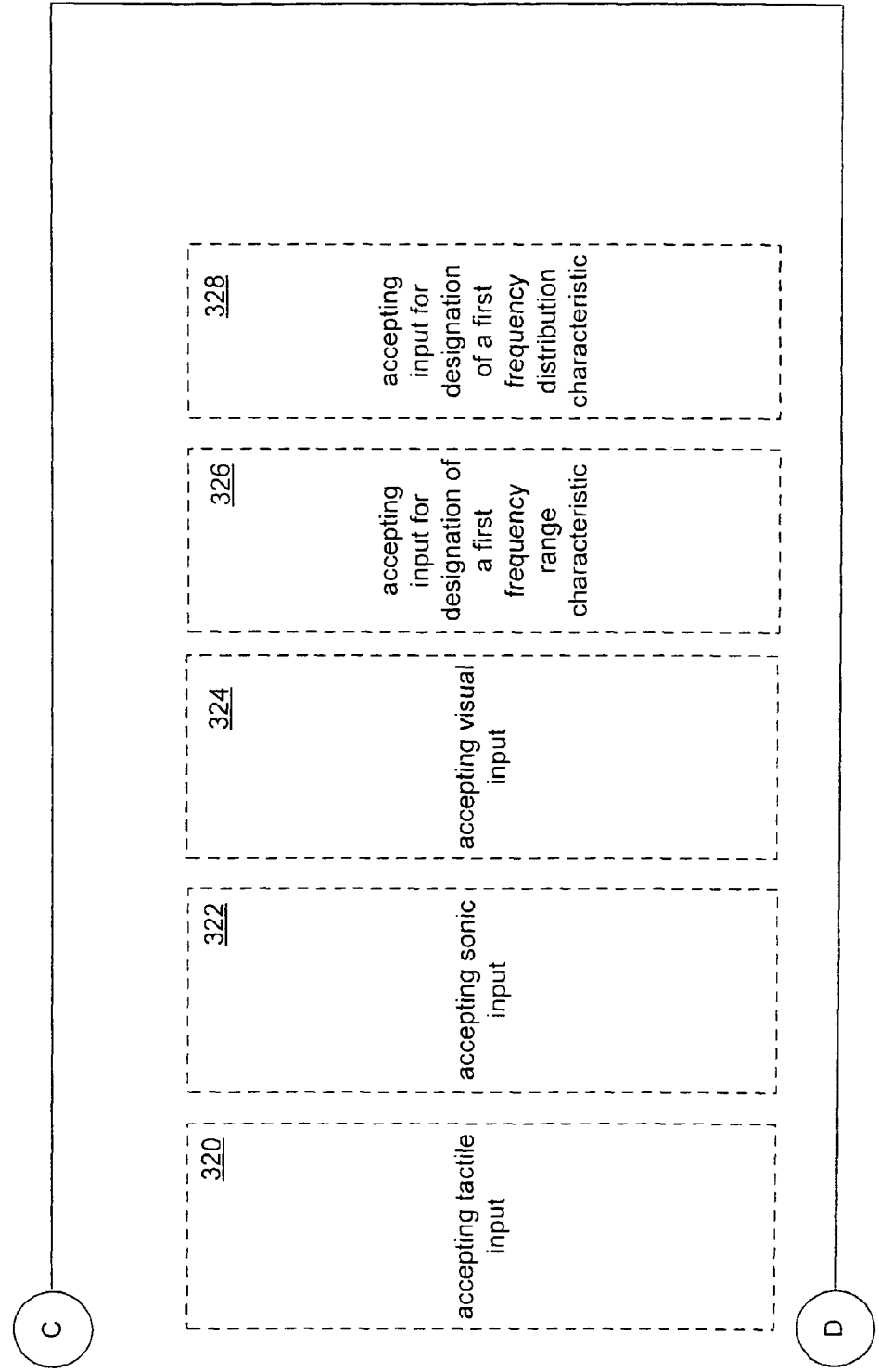

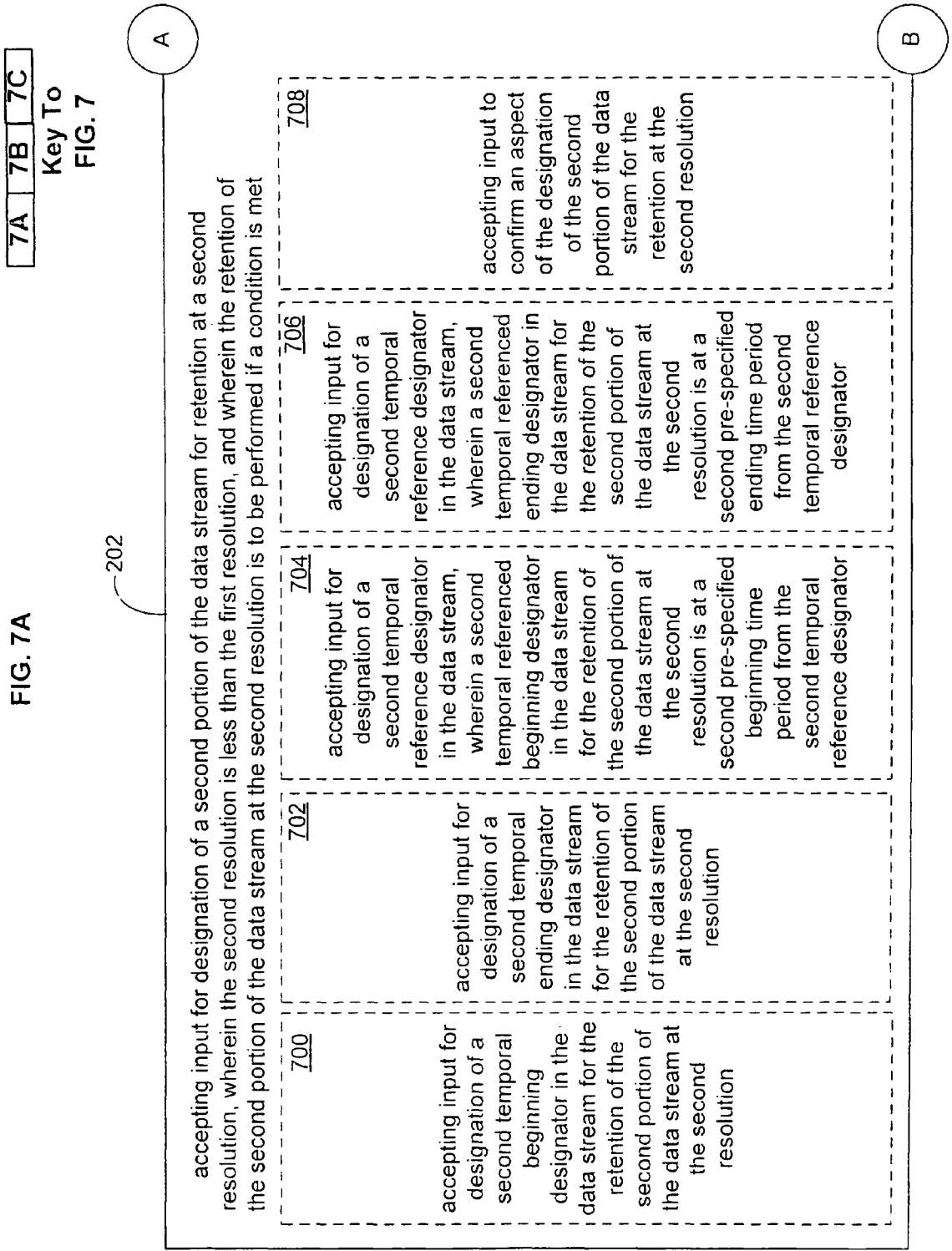

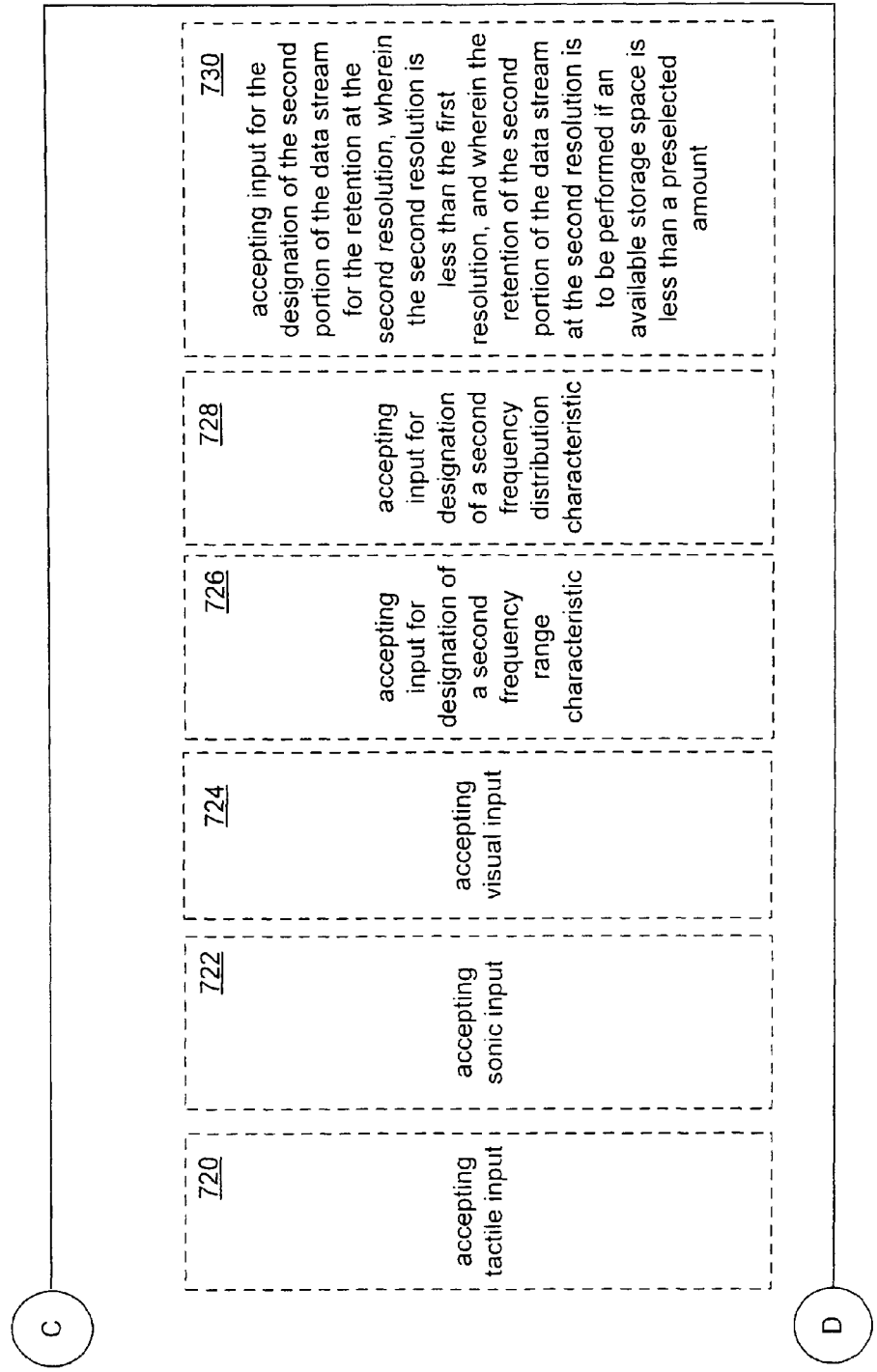

FIG. 12B

| 12A | 12B |
Key To
FIG. 12

1210
accepting input for the retention of the second portion of the data stream at the second resolution, wherein the retention of the second portion of the data stream at the second resolution is to be performed if a condition is met that is not related to a specified previous retention of the second portion of the data stream 1212
accepting input for the retention of the second portion of the data stream at the second resolution, wherein the retention of the second portion of the data stream at the second resolution is to be performed if a condition responsive to data received from a device other than a device used for a specified previous retention of the second portion of the data stream is met 1214
accepting input for the retention of the second portion of the data stream at the second resolution, wherein the retention of the second portion of the data stream at the second resolution is to be performed if a condition responsive to data received from a device other than a device to be used for the retention of the second portion of the data stream at the second resolution is met 1216
accepting input for the retention of the second portion of the data stream at the second resolution, wherein the method includes a method implemented in a first device, and wherein the retention of the second portion of the data stream at the second resolution is to be performed if a condition responsive to data received from a second device is met

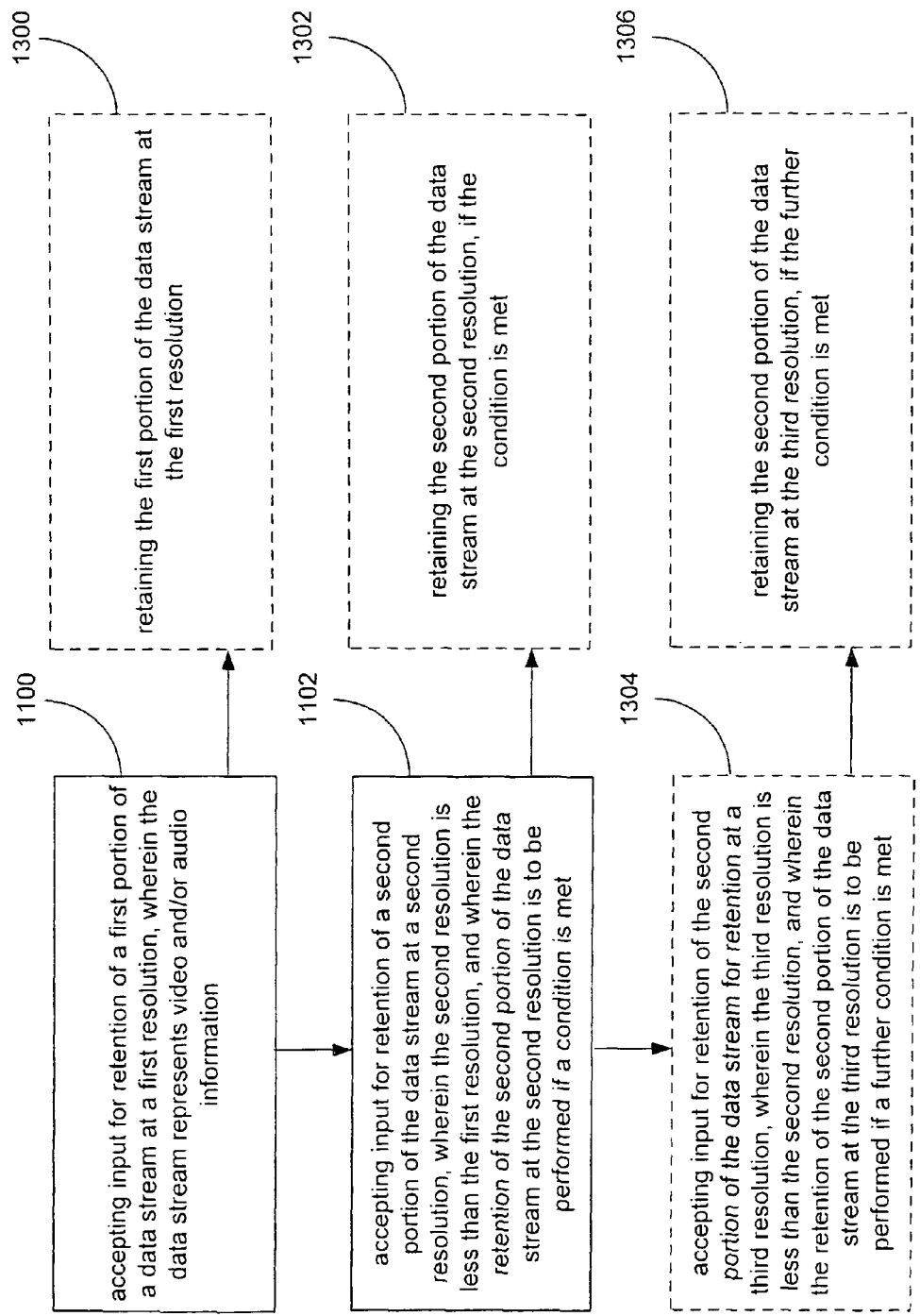

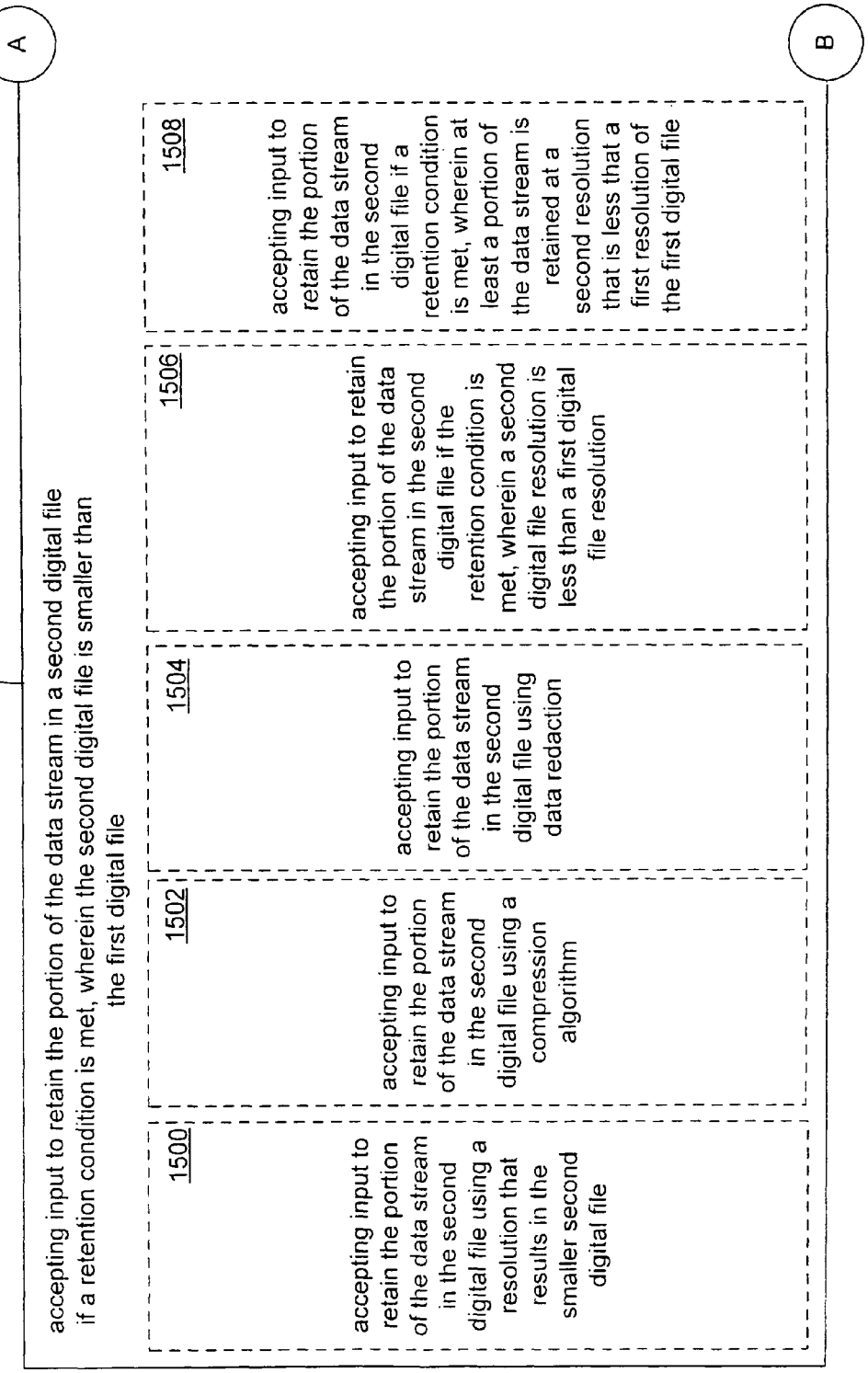

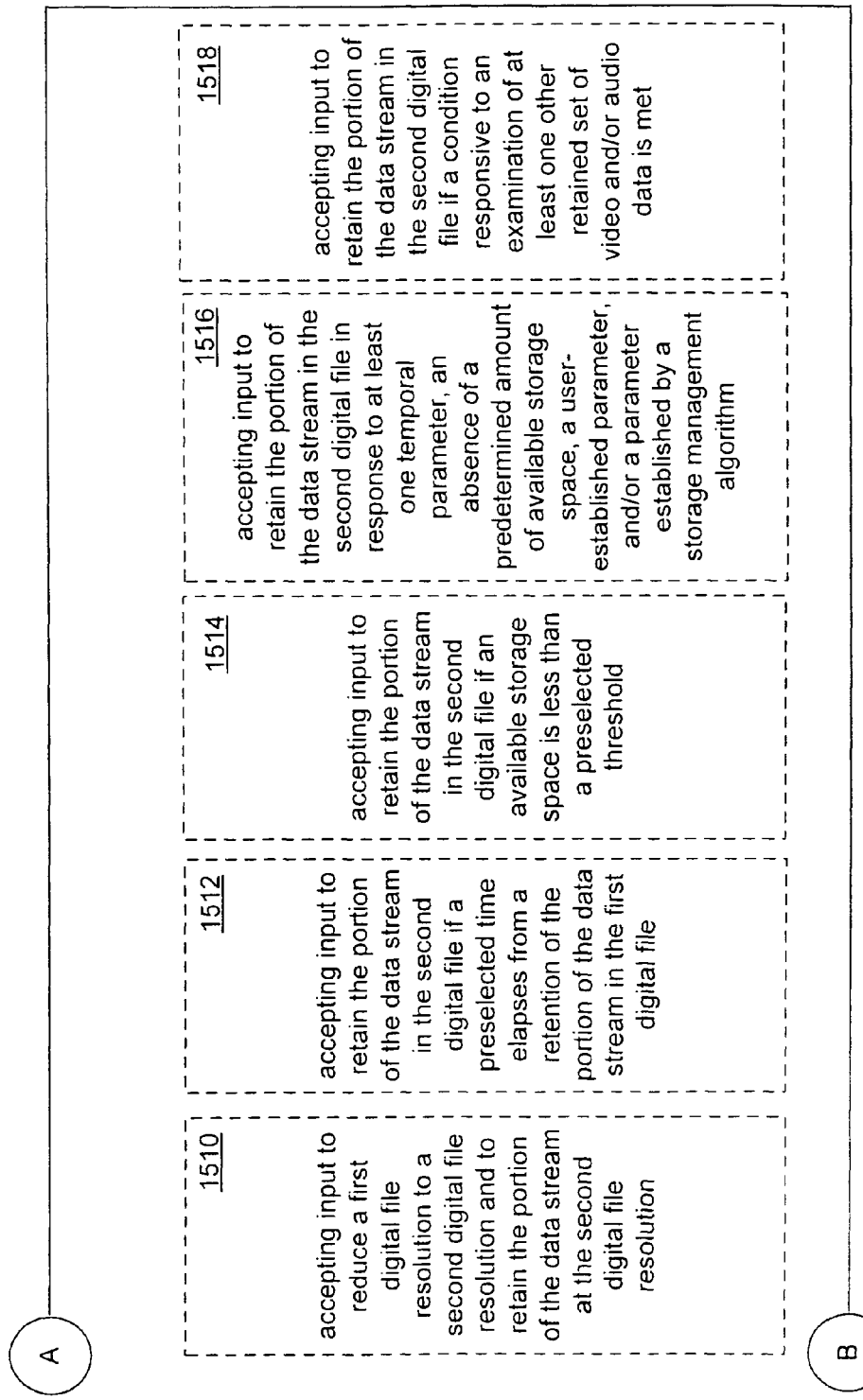

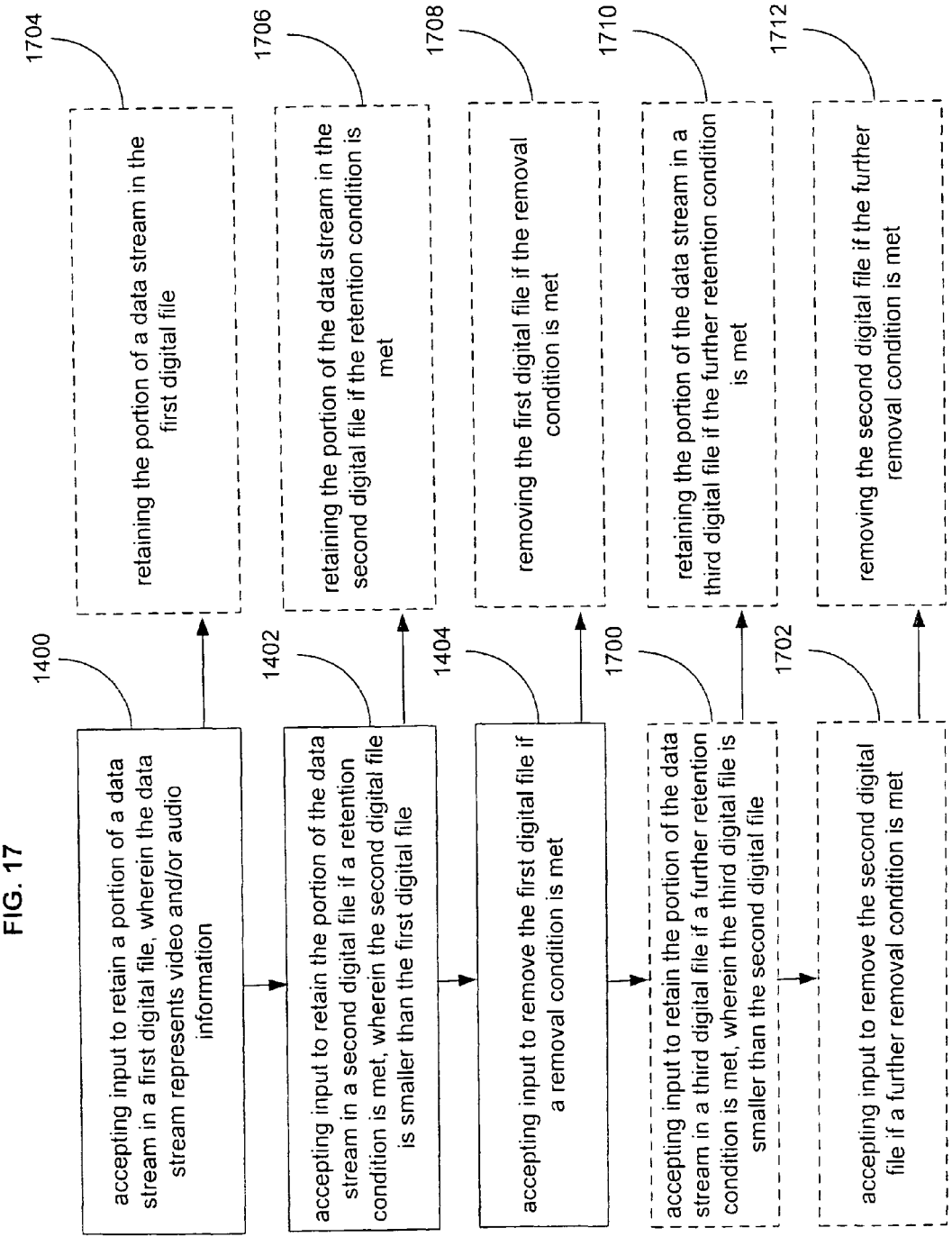

DEGRADATION/PRESERVATION MANAGEMENT OF CAPTURED DATA

CROSS-REFERENCE TO RELATED APPLICATIONS

The present application is related to, claims the earliest available effective filing date(s) from (e.g., claims earliest available priority dates for other than provisional patent applications; claims benefits under 35 USC §119(e) for provisional patent applications), and incorporates by reference in its entirety all subject matter of the following listed application(s) (the "Related Applications") to the extent such subject matter is not inconsistent herewith; the present application also claims the earliest available effective filing date(s) from, and also incorporates by reference in its entirety all subject matter of any and all parent, grandparent, great-grandparent, etc. applications of the Related Application(s) to the extent such subject matter is not inconsistent herewith.

RELATED APPLICATIONS

1. For purposes of the USPTO extra-statutory requirements, the present application constitutes a continuation-in-part of U.S. patent application Ser. No. 11/263,587, entitled Saved-Image Management, naming Royce A. Levien, Robert W. Lord, and Mark A. Malamud, as inventors, filed Oct. 31, 2005, now U.S. Pat. No. 7,872,675, or is an application of which a currently co-pending application is entitled to the benefit of the filing date.

2. For purposes of the USPTO extra-statutory requirements, the present application constitutes a continuation-in-part of U.S. patent application Ser. No. 11/264,701, entitled Conditional Alteration of a Saved Image, naming Royce A. Levien, Robert W. Lord, and Mark A. Malamud, as inventors, filed Nov. 1, 2005, which is currently co-pending, or is an application of which a currently co-pending application is entitled to the benefit of the filing date.

3. For purposes of the USPTO extra-statutory requirements, the present application constitutes a continuation in part of currently co-pending U.S. patent application entitled Imagery Processing, naming Edward K. Y. Jung, Royce A. Levien, Robert W. Lord, Mark A. Malamud, and John D. Rinaldo, Jr., as inventors, U.S. application No. 11/364,496, filed Feb. 28, 2006, which is currently co-pending, or is an application of which a currently co-pending application is entitled to the benefit of the filing date.

4. For purposes of the USPTO extra-statutory requirements, the present application constitutes a continuation-in-part of U.S. patent application Ser. No. 11/376,627, entitled Data Management of a Data Stream, naming Edward K. Y. Jung, Royce A. Levien, Robert W. Lord, Mark A. Malamud, and John D. Rinaldo, Jr., as inventors, filed Mar. 15, 2006, now abandoned, or is an application of which a currently co-pending application is entitled to the benefit of the filing date.

5. For purposes of the USPTO extra-statutory requirements, the present application constitutes a continuation-in-part of U.S. patent application Ser. No. 11/396,279, entitled Data Management of an Audio Data Stream, naming Edward K. Y. Jung, Royce A. Levien, Robert W. Lord, Mark A. Malamud, and John D. Rinaldo, Jr., as inventors, filed Mar. 31, 2006, now abandoned, or is an application of which a currently co-pending application is entitled to the benefit of the filing date.

6. For purposes of the USPTO extra-statutory requirements, the present application constitutes a continuation-in-part of U.S. patent application Ser. No. 11/413,271, entitled Data Management of Audio Aspects of a Data Stream, naming Edward K. Y. Jung, Royce A. Levien, Robert W. Lord, Mark A. Malamud, and John D. Rinaldo, Jr., as inventors, filed Apr. 28, 2006, now abandoned, or is an application of which a currently co-pending application is entitled to the benefit of the filing date.

7. For purposes of the USPTO extra-statutory requirements, the present application constitutes a continuation-in-part of U.S. patent application Ser. No. 11/434,568, entitled Degradation/Preservation Management of Captured Data, naming Edward K. Y. Jung, Royce A. Levien, Robert W. Lord, Mark A. Malamud and John D. Rinaldo, Jr., as inventors, filed 15 May 2006, which is currently co-pending, or is an application of which a currently co-pending application is entitled to the benefit of the filing date.

The United States Patent Office (USPTO) has published a notice to the effect that the USPTO's computer programs require that patent applicants reference both a serial number and indicate whether an application is a continuation or continuation in part. Stephen G. Kunin, Benefit of Prior-Filed Application, USPTO Electronic Official Gazette, Mar. 18, 2003 at http://www.uspto.gov/web/offices/com/sol/og/2003/week11/patbene.htm. The present applicant entity has provided below a specific reference to the application(s) from which priority is being claimed as recited by statute. Applicant entity understands that the statute is unambiguous in its specific reference language and does not require either a serial number or any characterization such as "continuation" or "continuation-in-part." Notwithstanding the foregoing, applicant entity understands that the USPTO's computer programs have certain data entry requirements, and hence applicant entity is designating the present application as a continuation in part of its parent applications, but expressly points out that such designations are not to be construed in any way as any type of commentary and/or admission as to whether or not the present application contains any new matter in addition to the matter of its parent application(s).

TECHNICAL FIELD

The present application relates, in general, to data management.

SUMMARY

In one aspect, a method related to data management includes but is not limited to accepting input for designation of a first portion of a data stream for retention at a first resolution, wherein the data stream represents video and/or audio information; and accepting input for designation of a second portion of the data stream for retention at a second resolution, wherein the second resolution is less than the first resolution, and wherein the retention of the second portion of the data stream at the second resolution is to be performed if a condition is met. In addition to the foregoing, other method aspects are described in the claims, drawings, and text forming a part of the present application.

In one aspect, a method related to data management includes but is not limited to accepting input for retention of a first portion of a data stream at a first resolution, wherein the data stream represents video and/or audio information; and accepting input for retention of a second portion of the data stream at a second resolution, wherein the second resolution is less than the first resolution, and wherein the retention of the second portion of the data stream at the second resolution is to be performed if a condition is met. In addition to the foregoing, other method aspects are described in the claims, drawings, and text forming a part of the present application.

In one aspect, a method related to data management includes but is not limited to accepting input to retain a portion of a data stream in a first digital file, wherein the data stream represents video and/or audio information; accepting input to retain the portion of the data stream in a second digital file if a retention condition is met, wherein the second digital file is smaller than the first digital file; and accepting input to remove the first digital file if a removal condition is met. In addition to the foregoing, other method aspects are described in the claims, drawings, and text forming a part of the present application.

In one aspect, a system related to data management includes but is not limited to circuitry for accepting input for designation of a first portion of a data stream for retention at a first resolution, wherein the data stream represents video and/or audio information; and circuitry for accepting input for designation of a second portion of the data stream for retention at a second resolution, wherein the second resolution is less than the first resolution, and wherein the retention of the second portion of the data stream at the second resolution is to be performed if a condition is met. In addition to the foregoing, other system aspects are described in the claims, drawings, and text forming a part of the present application.

In one aspect, a system related to data management includes but is not limited to circuitry for accepting input for retention of a first portion of a data stream at a first resolution, wherein the data stream represents video and/or audio information and circuitry for accepting input for retention of a second portion of the data stream at a second resolution, wherein the second resolution is less than the first resolution, and wherein the retention of the second portion of the data stream at the second resolution is to be performed if a condition is met. In addition to the foregoing. other system aspects are described in the claims, drawings, and text forming a part of the present application.

In one aspect, a system related to data management includes but is not limited to circuitry for accepting input to retain a portion of a data stream in a first digital file, wherein the data stream represents video and/or audio information; circuitry for accepting input to retain the portion of the data stream in a second digital file if a retention condition is met, wherein the second digital file is smaller than the first digital file; and circuitry for accepting input to remove the first digital file if a removal condition is met. In addition to the foregoing, other system aspects are described in the claims, drawings, and text forming a part of the present application.

In one aspect, a system related to data management includes but is not limited to circuitry for accepting input for designation of a first portion of a data stream for retention at a first resolution, wherein the data stream represents video and/or audio information; and circuitry for accepting input for designation of a second portion of the data stream for retention at a second resolution, wherein the second resolution is less than the first resolution, and wherein the retention of the second portion of the data stream at the second resolution is to be performed if a condition is met. In addition to the foregoing, other system aspects are described in the claims, drawings, and text forming a part of the present application.

In one or more various aspects, related systems include but are not limited to circuitry and/or programming and/or electromechanical devices and/or optical devices for effecting the herein-referenced method aspects; the circuitry and/or programming and/or electromechanical devices and/or optical devices can be virtually any combination of hardware, software, and/or firmware configured to effect the herein-referenced method aspects depending upon the design choices of the system designer skilled in the art.

In one aspect, a program product includes but is not limited to a signal bearing medium bearing one or more instructions for accepting input for designation of a first portion of a data stream for retention at a first resolution, wherein the data stream represents video and/or audio information; and one or more instructions for accepting input for designation of a second portion of the data stream for retention at a second resolution, wherein the second resolution is less than the first resolution, and wherein the retention of the second portion of the data stream at the second resolution is to be performed if a condition is met. In addition to the foregoing, other program product aspects are described in the claims, drawings, and text forming a part of the present application.

In one aspect, a program product includes but is not limited to a signal bearing medium bearing one or more instructions for accepting input for retention of a first portion of a data stream at a first resolution, wherein the data stream represents video and/or audio information; and one or more instructions for accepting input for retention of a second portion of the data stream at a second resolution, wherein the second resolution is less than the first resolution, and wherein the retention of the second portion of the data stream at the second resolution is to be performed if a condition is met. In addition to the foregoing, other program product aspects are described in the claims, drawings, and text forming a part of the present application.

In one aspect, a program product includes but is not limited to a signal bearing medium bearing one or more instructions for accepting input to retain a portion of a data stream in a first digital file, wherein the data stream represents video and/or audio information; one or more instructions for accepting input to retain the portion of the data stream in a second digital file if a retention condition is met, wherein the second digital file is smaller than the first digital file; and one or more instructions for accepting input to remove the first digital file if a removal condition is met. In addition to the foregoing, other program product aspects are described in the claims, drawings, and text forming a part of the present application.

In addition to the foregoing, various other method, system, and/or program product aspects are set forth and described in the teachings such as the text (e.g., claims and/or detailed description) and/or drawings of the present application.

The foregoing is a summary and thus contains, by necessity, simplifications, generalizations and omissions of detail; consequently, those skilled in the art will appreciate that the summary is illustrative only and is NOT intended to be in any way limiting. Other aspects, features, and advantages of the devices and/or processes and/or other subject matter described herein will become apparent in the teachings set forth herein.

BRIEF DESCRIPTION OF THE FIGURES

FIG. 3 shows several alternative implementations of the high-level logic flowchart of FIG. 2;

FIG. 13 depicts a high-level logic flowchart of an operational process;

FIG. 15 depicts several alternative implementations of the high-level logic flowchart of FIG. 14;

FIG. 17 shows a high-level logic flowchart of an operational process.

The use of the same symbols in different drawings typically indicates similar or identical items.

DETAILED DESCRIPTION

One skilled in the art will recognize that the herein described components (e.g., steps), devices, and objects and the discussion accompanying them are used as examples for the sake of conceptual clarity and that various configuration modifications are within the skill of those in the art. Consequently, as used herein, the specific exemplars set forth and the accompanying discussion are intended to be representative of their more general classes. In general, use of any specific exemplar herein is also intended to be representative of its class, and the non-inclusion of such specific components (e.g., steps), devices, and objects herein should not be taken as indicating that limitation is desired.

Figure 1:
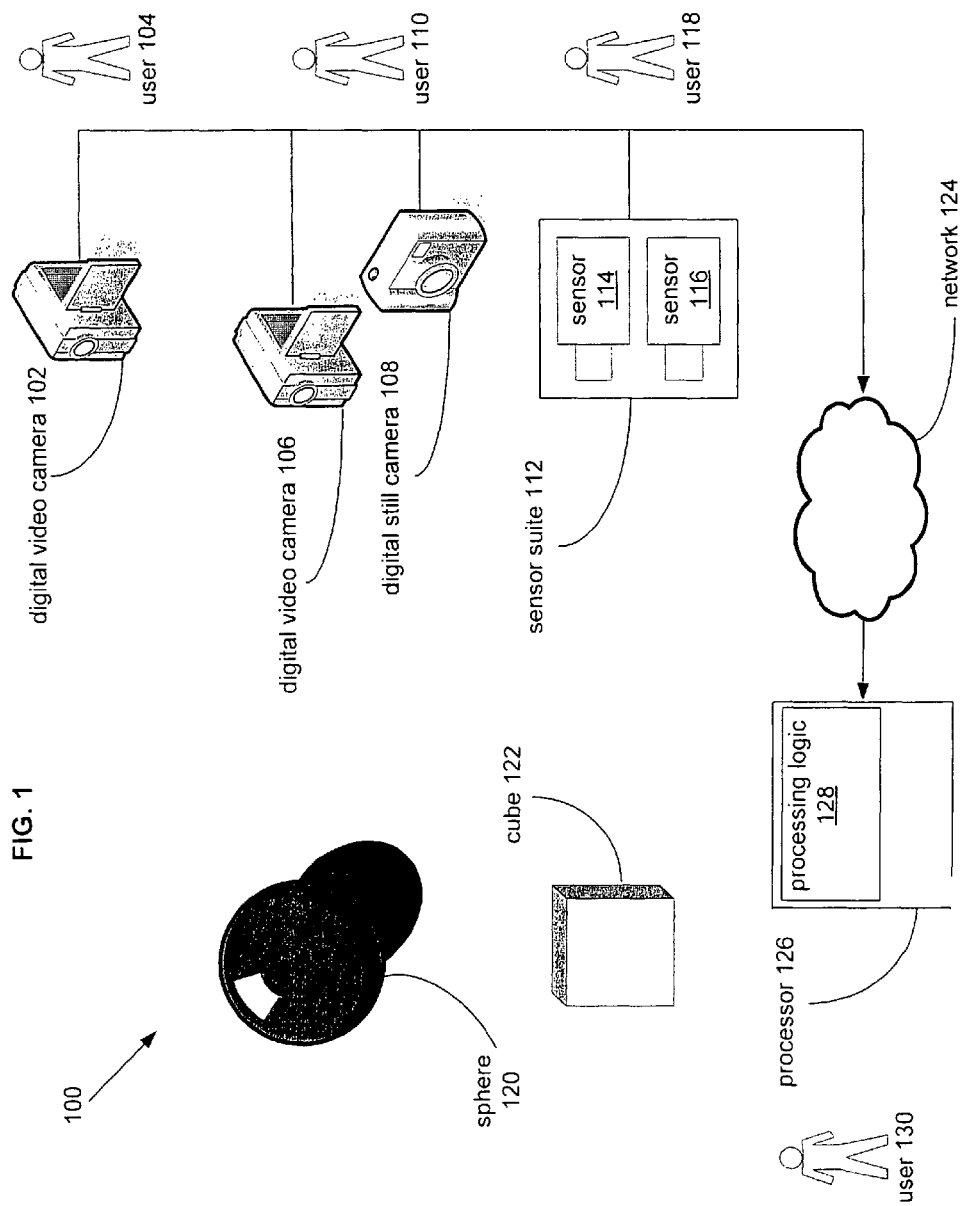
FIG. 1 depicts one implementation of an exemplary environment in which the methods and systems described herein may be represented.

FIG. 1 depicts one implementation of an exemplary environment in which the methods and systems described herein may be represented. In the depicted exemplary environment 100, illustrated are a variety of exemplary sensors: a digital video camera 102 operated by one or more users represented by user 104, where the digital video camera 102 may have a capability to record audio input; a digital video camera 106 used in conjunction with a digital still camera 108, where the digital video camera 106 and/or digital still camera 108 may either or both have a capability to record audio input, both operated by one or more users represented by user 110; and a sensor suite 112 comprising more than one sensor represented by sensor 114 and sensor 116 (wherein the sensors 114 and 116 may be but need not be physically co-located, and may be but need not be of the same type, e.g., sensor 114 may be an infrared device and sensor 116 may be a radar device, or, e.g. sensor 114 may be a microphone and the sensor 116 may be an infrared/visible light device), the sensor suite being operated by one or more users represented by user 118. Taken by themselves, each of the sensors 114 and 116 are exemplary of single independent sensors, and further, either of the sensors 114 or 116 may be audio sensors. The exemplary sensors may represent a variety of devices for the detection and/or the recording and/or the transmission of imagery aspects, e.g., images, and/or audio aspects, e.g., instances of particular voices and/or instances of particular sounds, including but not limited to microphones, digital video cameras, digital still cameras, digital sensor (e.g. CCD or CMOS) arrays, and radar sets. The exemplary users 104, 110, and/or 118 may, for example, operate the exemplary sensors manually or may supervise and/or monitor their automatic operation. The exemplary users 104, 110, and/or 118 may operate the exemplary sensors in physical proximity to the sensors or remotely. The exemplary sensors may also operate autonomously without exemplary users 104, 110, and/or 118.

The exemplary sensors may be used to detect and/or record and/or transmit images and/or sounds and/or other data related to a wide variety of objects, represented in FIG. 1 by exemplary objects, a sphere 120 and a cube 122. The sphere 120 and/or the cube 122 may be reflectors and/or emitters of electromagnetic radiation such as visible light and/or microwaves, reflectors and/or emitters of particulate radiation such as electrons and/or neutrons, and/or reflectors and/or emitters of sonic energy. The sphere 120 and the cube 122 are representative of any object(s) or groups of objects, images and/or emitting and/or reflecting sources of sounds and/or other related data which may be detectable and/or recordable and/or transmissible by the exemplary sensors, including but not limited to persons, animals, buildings, roads, automobiles, trucks, aircraft, ships, spacecraft, landscape and/or seascape features, vegetation, and/or celestial objects. When used together in any given example herein, the exemplary sphere 120 and the exemplary cube 122 generally represent two distinct objects which may or may not be of the same or of a similar type, except where otherwise required by the context, e.g., a sphere 120 and a cube 122 used together in an example may represent a first particular object and a second particular object, e.g., a particular person and a particular building, or a particular first aircraft and a particular second aircraft, respectively. When used alone in any given example herein, the designated exemplary object, e.g., the sphere 120 or the cube 122, generally represents the same object, except where otherwise required by the context, e.g., a sphere 120 used alone in an example generally represents a single object, e.g., a single building, and a cube 122 used alone generally represents a single object, e.g., a particular person.

Each of the exemplary sensors may detect and/or record and/or transmit images and/or sounds and/or other related data of the exemplary objects in a variety of combinations and sequences. For instance, the digital video camera 102 may detect and/or record and/or transmit an image and/or sound and/or other related data of the sphere 120 and then an image and/or sound and/or other related data of the cube 122 sequentially, in either order; and/or, the digital video camera 106 may detect and/or record and/or transmit a single image and/or sound and/or other related data of the sphere 120 and the cube 122 together.

Similarly, the digital video camera 106 may detect and/or record and/or transmit an image and/or sound and/or other related data of the sphere 120 and of the cube 122 sequentially, in either order, and/or of the sphere 120 and the cube 122 together, before, after, partially simultaneously with, or simultaneously with an operation of the digital still camera 108. The digital still camera 108 may detect and/or record and/or transmit an image and/or sound and/or other related data of the sphere 120 and of the cube 122 sequentially, in either order, and/or of the sphere 120 and the cube 122 together, before, after, partially simultaneously with, or simultaneously with an operation of the digital video camera 106.

Similarly, the sensor 114 and the sensor 116 of the sensor suite 112 may detect and/or record and/or transmit an image and/or sound and/or other related data of the sphere 120 and of the cube 122 sequentially, in either order, and/or of the sphere 120 and the cube 122 together, before, after, partially simultaneously with, or simultaneously with respect to each other.

Such images and/or sounds and/or related data may be recorded and/or transmitted via a computer or computers represented by the network 124 and/or directly to a processor 126 and/or processing logic 128, which accept data representing imagery aspects and/or sounds and/or related data pertaining to the exemplary objects. The processor 126 represents one or more processors that may be, for example, one or more computers, including but not limited to one or more laptop computers, desktop computers, and/or other types of computers. The processing logic 128 may be software and/or hardware and/or firmware associated with the processor 126 and capable of accepting and/or processing data representing imagery and/or sounds and/or other related data aspects of the exemplary objects from the exemplary sensors and from memory in the case of data stored in memory. Such processing may include but is not limited to comparing at least a portion of the data from one sensor with at least a portion of the data from the other sensor, and/or applying a mathematical process and/or heuristic process to at least a portion of the data from one sensor with at least a portion of the data from the other sensor, and/or accepting input related to the analysis, manipulation, and/or retention of data from the sensors, including but not limited to live, substantially live, and/or retained data, e.g., stored in memory. Such processing may also include, but is not limited to, deriving third data from the combining at least a portion of the data from one sensor with at least a portion of the data from another sensor.

The digital video camera 102, the digital video camera 106, the sensor 114 and/or the sensor 116 (operating as components of sensor suite 112 or separately as single independent sensors) may be capable of detecting and/or recording and/or transmitting information representing audio input and accepting input representing information for the manipulation and/or retention of such audio information, including but not limited to accepting input for a designation of a reference designator in a video/audio data stream (e.g., a data stream including video and/or audio information) originating from one of the exemplary sensors via detection and/or transmission and/or playback; accepting input for a designation of a temporal beginning designator and/or a beginning demarcation designator in such a video/audio data stream; accepting input for a designation of a temporal ending designator and/or an ending demarcation designator in such a video/audio data stream; and accepting input for retaining at a high resolution a portion of such a video/audio data stream beginning substantially at the temporal beginning designator and/or the beginning demarcation designator and ending substantially at the temporal ending designator and/or the ending demarcation designator. Such input may include confirmation of previous input. Further, the processor 126 and/or the processing logic 128 may be capable of receiving such a video/audio data stream from the exemplary sensors and/or from other computing resources and/or capable of playback of such a video/audio data stream that has been previously retained within the processor 126 and/or the processing logic 128 and/or elsewhere. In addition, processor 126 and/or the processing logic 128 may be capable of accepting input representing information for the manipulation and/or retention of such audio information, including the input described herein in connection with the exemplary sensors.

In accepting input, an embodiment may accept input initiated in a variety of ways, including but not limited to initiation by one or more human users such as the users 104, 110, 118, and/or 130; by the action of one or more processors and/or processing logic integral with, associated with, and/or operably coupled to a device such as the digital video camera 102; by the action of a one or more processors such as the processor 126 and/or by processing logic such as the processing logic 128; and/or by a combination of human and processor/ processing logic interaction, such as a user 130 interacting with the digital still camera 108 and/or the processor 126 and/or the processing logic 128.

Accepting input from one or more human users such as the users 104, 110, 118, and/or 130 may include but is not limited to accepting input initiated by interaction with various interface devices such as computer mouse devices, keyboards, and graphical user interfaces; with interface devices that detect sound, such as microphones; with interface devices that detect electromagnetic radiation, such as visible and/or infrared light sensors and cameras; and with interface devices that present visual interface features such as graphical user interfaces.

Accepting input initiated by the action of one or more processors and/or processing logic, such as the processor 126 and/or the processing logic 128 may include but is not limited to accepting input initiated by a processor and/or processor logic analysis of a data stream including detection of video/ imagery/audio data that satisfies certain conditions and/or parameters that require or indicate the usefulness of designation of those aspects or of reference points indicating the presence and/or limits of those aspects. For example, the processor 126 and/or the processing logic 128 may, in an analysis of a video/imagery/audio data stream, whether the stream be live, substantially live, or retained data, detect the beginning of voice of a particular person of interest whose vocal characteristics are available to the processor 126 and the processing logic 128 and which are used to define detection/ recognition parameters, and the processor 126 and/or the processing logic 128 may, upon detection of the voice using those parameters, initiate input to designate a portion of the data stream including the voice for retention.

Accepting input initiated by a combination of human and processor/processing logic interaction, such as a user 130 interacting with the digital still camera 108 and/or the processor 126 and/or the processing logic 128, may include but is not limited to a user such as user 110 interacting with the digital video camera 106, the processor 126, and the processing logic 128 to review a video/imagery/audio data stream, detect video/imagery/audio aspects of interest such as images and voices of particular people and to designate for retention, command retention of, and retain those aspects of interest.

With regard to accepting input designating a video/imagery aspect and/or an audio aspect of a video/audio data stream, such input may represent an indication from an exemplary user 104, 110, 118, and/or 130, or from the processor 126 and/or the processing logic 128, of a video/imagery aspect and/or an audio aspect, e.g., video/imagery/audio information of interest, such as a particular human voice or a particular mechanical sound, e.g., an auto engine, or the relative absence of sound, such as a relative silence between two human speakers or two musical phrases, and/or an image of a particular person of interest. Such designation may be for the purpose or purposes of, e.g., retention at high resolution, interactive review of the portion of the video/audio data stream of interest, or analysis of the portion of interest. A video/imagery aspect and/or an audio aspect may be characterized at least in part by a temporal beginning, a temporal ending, an intensity and/or range of intensities and/or distribution of intensities, a frequency and/or range of frequencies and/or distribution of frequencies.

With regard to input for a designation of a reference designator in a video/audio data stream, such input may represent an indication from an exemplary user 104, 110, 118, and/or 130, or from the processor 126 and/or the processing logic 128, of video/imagery/audio information of interest, such as a particular human voice or a particular mechanical sound, e.g., an auto engine, or the relative absence of sound, such as a relative silence between two human speakers or two musical phrases, or an image of a particular object of interest. The reference designator may be designated in the video/audio data stream such that it falls within and/or references a place within the portion of the video/audio data stream comprising the particular video/imagery/audio aspect of interest. The reference designator may be designated via initiating input in a variety of ways, including but not limited to pressing a button on a computer interface device, manipulating features of a graphical interface such as pull-down menus or radio buttons, speaking into a microphone, and/or using the processor 126 and/or the processing logic 128 to initiate automatically such input when the data in a video/audio data stream satisfies some criteria for video/imagery/audio data of interest.

With regard to input for designation of a temporal beginning designator and/or a beginning demarcation designator in a video/audio data stream, such input may represent an indication from an exemplary user 104, 110, 118, and/or 130, or from the processor 126 and/or the processing logic 128, of a point in the video/audio data stream at which a portion of interest of the video/audio data stream begins, such as (but not limited to) the end a relative silence (e.g., silence except for background and/or artifact noise) occurring last before a designated reference designator, the beginning of the sound of interest or of one or more of the sounds accompanying a sound of interest, or the end of a sound occurring last before a designated reference designator, or the beginning of a video image of a particular person of interest. The temporal beginning designator and/or the beginning demarcation designator may be designated in the video/audio data stream such that it falls within and/or references a place at or near the beginning of the portion of the video/audio data stream comprising the particular sound of interest. The temporal beginning designator and/or the beginning demarcation designator may be designated via initiating input in a variety of ways, including but not limited to pressing a button on a computer interface device, manipulating features of a graphical interface such as pull-down menus or radio buttons, speaking into a microphone, and/or using the processor 126 and/or the processing logic 128 to initiate automatically such input when the data in a video/audio data stream satisfies some criteria for demarcation of video/imagery/audio data of interest.

With regard to input for designation of a temporal ending designator and/or an ending demarcation designator in a video/audio data stream, such input may represent an indication from an exemplary user 104, 110, 118, and/or 130, or from the processor 126 and/or the processing logic 128, of a point in the video/audio data stream at which a portion of interest of the video/audio data stream ends. The temporal ending designator and/or the ending demarcation designator may represent the point in the video/audio data stream falling at the end of a portion of interest, such as (but not limited to) the end of the presence of an image of a vehicle of interest, the end a relative silence (e.g., silence except for background and/or artifact noise) occurring just after the end of the sound of interest or of one or more of the sounds accompanying a sound of interest, or the end of a sound occurring just after a designated reference designator. The temporal ending designator and/or the ending demarcation designator may be designated in the video/audio data stream such that it falls within and/or references a place at or near the end of the portion of the video/audio data stream comprising the particular sound of interest. The temporal ending designator and/or the ending demarcation designator may be designated via initiating input in a variety of ways, including but not limited to pressing a button on a computer interface device, manipulating features of a graphical interface such as pull-down menus or radio buttons, speaking into a microphone, and/or using the processor 126 and/or the processing logic 128 to initiate automatically such input when the data in a video/audio data stream satisfies some criteria for video/imagery/audio data of interest.

With regard to input for retaining at a high resolution a portion of a video/audio data stream, including but not limited to a video/imagery/audio aspect of a video/audio data stream, such high resolution retention includes but is not limited to storage of a relatively large amount of data, compared to storage of portions of the data stream not selected for high resolution retention, as described herein. Such input may include but is not limited to designation of a high resolution value, e.g., 0.5 MB/second, and/or frequency spectrum characteristics, e.g., lower and upper frequency cut-offs. For example, the user 130 may provide input to the processor 126 and/or the processing logic 128 to identify a portion of a video/audio data stream for retention at high resolution, e.g., input designating an audio aspect of a video/audio data stream and/or input designating a video/imagery aspect of a video/audio data stream. The processor 126 and/or the processing logic 128 may accept the input, enabling the identified portion (e.g., a designated audio aspect) to be stored with high fidelity relative to the source video/audio and with a relatively small proportion of data (if any) discarded, while the portion or portions not selected for high resolution retention may be stored at a relatively lower resolution, e.g., with a relatively higher proportion of data discarded, e.g., to save storage resources.

Retention of a portion, e.g., a video/imagery/audio aspect, of a video/audio data stream at a relatively high resolution and retention of portions of the video/audio data stream not included in the portion designated for retention at the high resolution may result in storage of the portion not included in the portion to be retained at the high resolution at one or more resolutions that do not use all of the data available, such that the portion not to be retained at the high resolution is degraded in storage. Degradation of a portion not included in the portion retained or designated for retention at high resolution may be achieved by retaining the not-included portion at one or more lower resolutions, where the one or more lower resolutions may be a function of the distance in the video/audio data stream between the portion to be retained at a high resolution and the portion to be retained at one or more lower resolutions, including but not limited to degrading blocks of data not included in the high resolution portion according to their distance from the high resolution portion (e.g., degrading to one lower resolution a portion between 0 and 60 seconds from the high resolution portion, and degrading to another, even lower resolution a portion between 60 and 120 seconds from the high resolution portion, and so on). One or more inputs may be accepted to set one or more rules by which a portion of a video/audio data stream not included in a portion designated for high resolution retention is degraded and/or retained at one or more lower resolutions. One or more inputs for degradation may be accepted to specify parameters including but not limited to one or more specific resolution values (e.g., 12 kB/sec and/or 20 kB/sec), one or more frequency range characteristics, and/or one or more frequency distribution characteristics. Degradation to one or more lower resolutions may be correlated to one or more specified frequency ranges and/or one or more specified frequency distribution characteristics, such as specific lower resolutions for all sounds above 100 Hz, and/or between 2 kHz and 20 kHz, and/or below 5 kHz, and/or one or more specific lower resolutions for all sounds conforming to a specific frequency distribution characteristic of a particular human voice or musical instrument, and/or, with regard to video/imagery, specific lower resolution for parts of a video/audio data stream that do not include video/imagery of a particular color range. Degradation to one or more lower resolutions may be correlated to the time frame in which a portion of a video/audio data stream has been detected and/or recorded and/or transmitted and/or stored, e.g., video/audio data detected and/or recorded and/or transmitted and/or stored within a week may be retained at the resolution at which it was detected and/or recorded and/or transmitted and/or stored, while data detected and/or recorded and/or transmitted and/or stored between one and two weeks ago may be degraded to 80% of the resolution at which it was detected and/or recorded and/or transmitted and/or stored, and data detected and/or recorded and/or transmitted and/or stored between two and four weeks ago may be degraded to 60% of the resolution at which it was detected and/or recorded and/or transmitted and/or stored, and so on. One or more inputs may be accepted to confirm previous inputs or default values related to degrading data and/or retaining such data at a relatively lower resolution value. One or more inputs may be accepted for degrading a portion of a video/audio data stream not included in a portion designated for retention at high resolution. Inputs may include but not be limited to tactile, sonic, and/or visual inputs. Such an input may be initiated by an action by a user 104, 110, 118, or 130, e.g., pressing a mouse button and/or speaking into a microphone, or the input may be initiated by operation of some hardware/software/firmware, e.g., audio processing software such as the processor 126 and/or the processing logic 128, or it may be initiated by some combination of human and automated action.

In addition to accepting inputs for degrading to at least one lower resolution a portion of a video/audio data stream not included in a portion designated for retention at high resolution, degrading and/or retaining at a lower resolution a portion of a video/audio data stream not included in a portion designated for retention at high resolution may also be performed. Retention at one or more lower resolutions may be performed, e.g., by using one or more memory locations associated with and/or operably coupled to the digital video camera 102 and/or the digital video camera 106 and/or the sensor 114 and/or the sensor 116 and/or the processor 126 and/or the processing logic 128. Degradation may be performed by methods including but not limited to data compression and/or data redaction.

With respect to this example, input for the identification of a particular portion for retention at a relatively higher resolution does not preclude input for the storage of a distinct and/or an overlapping portion of the data stream at a distinct higher resolution compared to the retention resolution of one or more portions not identified for retention at a higher resolution, e.g., one or more portions of a data stream may be identified for retention at one or more relatively high resolutions. Similarly, input for the identification of a particular portion for retention at a relatively lower resolution does not preclude input for the storage of a distinct and/or an overlapping portion of the data stream at a distinct lower resolution compared to the retention resolution of one or more portions identified for retention at a higher resolution, e.g., one or more portions of a data stream may be identified for retention at one or more relatively lower resolutions.

Further, a video/imagery aspect may be designated for retention or retained at a particular resolution on the basis of a presence or absence of some audio aspect of a video/audio stream, and an audio aspect may be designated for retention or retained at a particular resolution on the basis of a presence or absence of some video/imagery aspect of a video/audio stream. For instance, the presence of an image of a particular person of interest in a video/audio data stream may serve as the basis for a designation of an audio aspect of the video/audio data stream for retention at high resolution, and vice versa.

A particular portion identified for retention at a high or a low resolution may include more than one data set that may generally be considered to constitute a "frame" in a video/audio data stream. With respect to this example, digital video cameras 102 and/or 106 are representative of any sensor or sensor suite capable of detecting and/or recording and/or transmitting video/audio input as one or more data streams representing the video/audio information. Such input may be initiated in a variety of ways, including but not limited to pressing a button on a computer interface device, manipulating features of a graphical interface such as pull-down menus or radio buttons, speaking into a microphone, and/or using the processor 126 and/or the processing logic 128 to initiate automatically such input when the data in a video/audio data stream satisfies some criteria for video/imagery/audio data of interest.

With regard to retaining at a high resolution a portion of a video/audio data stream, e.g., a video/imagery/audio aspect of the video/audio data stream, such retention may include storage in computer memory, such as memory associated with and/or operably coupled to the processor 126 and/or the processing logic 128.

The exemplary sensors may be capable of detecting and/or recording and/or transmitting one or more imagery and/or sound and/or other related data aspects of the exemplary objects, the one or more imagery aspects and/or sound and/or other related data aspects being defined in part, but not exclusively, by exemplary parameters such as focal length, aperture (f-stop being one parameter for denoting aperture), t-stop, shutter speed, sensor sensitivity (such as film sensitivity (e.g., film speed) and/or digital sensor sensitivity), exposure (which may be varied by varying, e.g., shutter speed and/or aperture), frequency and/or wavelength, focus, depth of field, white balance (and/or white point, color temperature, and/or micro reciprocal degree or "mired"), signal/noise ratio, an identified voice of a person or machine, and/or flash (sound aspects are described elsewhere herein). Some or all of the parameters that may define at least in part imagery and/or sounds and/or other related data aspects may have further defining parameters. For example, a frequency and/or wavelength parameter may be associated with one or more bandwidth parameters; and a flash parameter may be associated with one or more parameters for, e.g., duration, intensity, and/or special distribution. Note that although certain examples herein discuss bracketing and/or imagery aspects and/or exemplary parameters in the context of more or less "still" images for sake of clarity, techniques described herein are also applicable to streams of images, such as would typically be produced by digital video cameras 102/106 and thus the use of such, and other, exemplary terms herein are meant to encompass both still and video bracketing/aspects/parameters/etc. unless context dictates otherwise. For instance, the bracketing might include bracketing over, say, 20 frames of video.

Each of the exemplary sensors may detect and/or record and/or transmit one or more imagery aspects and/or sound aspects and/or other related data aspects of an exemplary object at more than one setting of each of the available parameters, thereby bracketing the exemplary object. Generally, "bracketing" includes the imagery technique of making several images of the same object or objects using different settings, typically with a single imagery device such as digital video camera 106. For example, the digital video camera 106 may detect and/or record and/or transmit a series of imagery aspects of the cube 122 at a number of different f-stops; before, after, partially simultaneously with, and/or simultaneously with that series of imagery aspects, another digital video camera 106 and/or another type of sensor, such as sensor 114 may detect and/or record and/or transmit a series of imagery aspects of the sphere 120 and of the cube 122 at a number of different white balances. The processor 126 and/or the processing logic 128 may then accept, via the network 124 or directly, data representing the imagery aspects detected and/or recorded and/or transmitted by the digital video cameras 106 or by the digital video camera 106 and the sensor 114. The processor 126 and/or the processing logic 128 may then combine at least a portion of the data from one of the sensors with at least a portion of the data from the other sensor, e.g., comparing the data from the two sensors. For example, deriving an identity of color and orientation from the bracketing imagery aspect data of two cubes 122 from digital video camera 106 and sensor 114.

Exemplary digital video cameras 102 and/or 106 may also be capable of detecting and/or recording and/or transmitting video/audio input as one or more data streams representing the video/audio information. Exemplary users 104 and/or 110 and/or another person and/or entity such as user 130 may provide input to the digital video camera 102 and/or the processor 126 and/or the processing logic 128 to select at least a portion of a data stream representing the video/audio information for retention at high resolution (where retention at high resolution is as described herein), e.g., imagery such as an image of a particular object and/or an audio aspect such as an instance of a particular voice and/or an instance of a particular sound. With respect to this example, digital video cameras 102 and/or 106 are representative of any sensor or sensor suite capable of detecting and/or recording and/or transmitting video/audio input as one or more data streams representing the video/audio information.

Those skilled in the art will appreciate that the explicitly described examples involving the exemplary sensors (the digital video camera 102, the digital video camera 106, the digital still camera 108, and the sensor suite 112 including sensor 114 and sensor 116), the exemplary users (users 104, 110, and 118), the exemplary objects (the sphere 120 and the cube 122), the network 124, the exemplary processor 126, and the exemplary processing logic 128 constitute only a few of the aspects illustrated by FIG. 1.

Following are a series of flowcharts depicting implementations of processes. For ease of understanding, the flowcharts are organized such that the initial flowcharts present implementations via an overall "big picture" viewpoint and thereafter the following flowcharts present alternate implementations and/or expansions of the "big picture" flowcharts as either sub-steps or additional steps building on one or more earlier-presented flowcharts. Those having skill in the art will appreciate that the style of presentation utilized herein (e.g., beginning with a presentation of a flowchart(s) presenting an overall view and thereafter providing additions to and/or further details in subsequent flowcharts) generally allows for a rapid and easy understanding of the various process implementations. In addition, those skilled in the art will further appreciate that the style of presentation used herein also lends itself well to modular and/or object-oriented program design paradigms.

Figure 2:
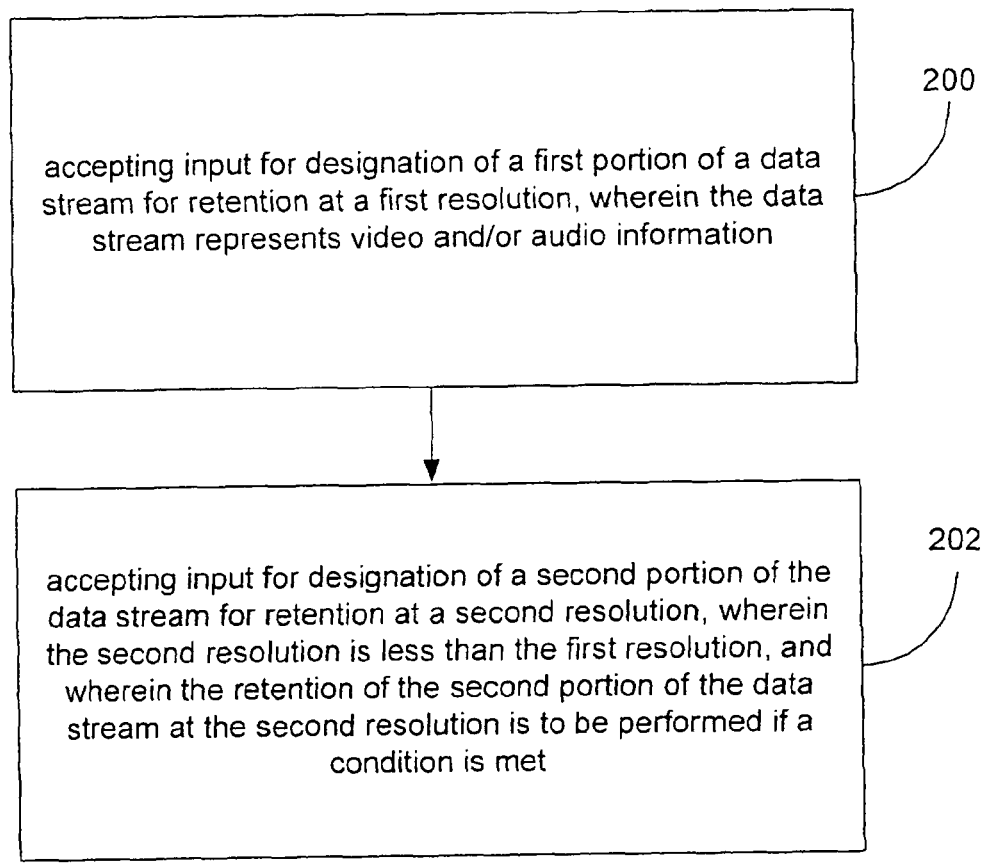
FIG. 2 depicts a high-level logic flowchart of an operational process.

FIG. 2 depicts a high-level logic flowchart of an operational process. The depicted operational process may include operation 200 and/or 202. Operation 200 shows accepting input for designation of a first portion of a data stream for retention at a first resolution, wherein the data stream represents video and/or audio information (e.g., accepting input, via the digital video camera 102 and/or the digital video camera 106 and/or the sensor 114 and/or the sensor 116 and/or the processor 126 and/or processing logic 128, for designation of a five-second portion of a video and/or audio data stream from the digital video camera 102 for retention in data storage at a resolution sufficient to reproduce the original video and/or audio at high fidelity).

Operation 202 shows accepting input for designation of a second portion of the data stream for retention at a second resolution, wherein the second resolution is less than the first resolution, and wherein the retention of the second portion of the data stream at the second resolution is to be performed if a condition is met (e.g., accepting input, via the digital video camera 102 and/or the digital video camera 106 and/or the sensor 114 and/or the sensor 116 and/or the processor 126 and/or processing logic 128, for designation of a one-minute portion of a video and/or audio data stream from the sensor 114 for retention in data storage at a relatively low resolution to save storage resources, if the one-minute portion was originally retained over one week in the past; in addition, a retention of a second portion of a video/audio data stream at a second resolution may be performed if one or more conditions are met, including exemplary conditions described elsewhere herein).

FIG. 3 shows several alternative implementations of the high-level logic flowchart of FIG. 2. Operation 200—accepting input for designation of a first portion of a data stream for retention at a first resolution, wherein the data stream represents video and/or audio information—may include one or more of the following operations: 300, 302, 304, 306, 308, 310, 312, 314, 316, 318, 320, 322, 324, 326, and/or 328.

Operation 300 shows accepting input for designation of a first temporal beginning designator in the data stream for the retention of the first portion of the data stream at the first resolution (e.g., accepting input, via the digital video camera 102 and/or the digital video camera 106 and/or the sensor 114 and/or the sensor 116 and/or the processor 126 and/or processing logic 128, for designation of a temporal beginning designator of the beginning of a three-second portion of a video and/or audio data stream from the digital video camera 106 for retention in data storage at a resolution sufficient to reproduce the original video and/or audio at relatively high resolution).

Operation 302 depicts accepting input for designation of a first temporal ending designator in the data stream for the retention of the first portion of the data stream at the first resolution (e.g., accepting input, via the digital video camera 102 and/or the digital video camera 106 and/or the sensor 114 and/or the sensor 116 and/or the processor 126 and/or processing logic 128, for designation of a temporal ending designator of the ending of a three-second portion of a video and/or audio data stream from the digital video camera 106 for retention in data storage at a resolution sufficient to reproduce the original video and/or audio at relatively high resolution).

Operation 304 illustrates accepting input for designation of a first temporal reference designator in the data stream, wherein a first temporal referenced beginning designator in the data stream for the retention of the first portion of the data stream at the first resolution is at a first pre-specified beginning time period from the first temporal reference designator (e.g., accepting input, via the digital video camera 102 and/or the digital video camera 106 and/or the sensor 114 and/or the sensor 116 and/or the processor 126 and/or processing logic 128, for designation of a temporal reference designator, with respect to which a temporal referenced beginning designator designates the beginning of a pre-specified beginning time period of three seconds earlier, of a six-second portion of a video and/or audio data stream from the digital video camera 106 for retention in data storage at a resolution sufficient to reproduce the original video and/or audio at relatively high resolution).

Operation 306 shows accepting input for designation of a first temporal reference designator in the data stream, wherein a first temporal referenced ending designator in the data stream for the retention of the first portion of the data stream at the first resolution is at a first pre-specified ending time period from the first temporal reference designator (e.g., accepting input, via the digital video camera 102 and/or the digital video camera 106 and/or the sensor 114 and/or the sensor 116 and/or the processor 126 and/or processing logic 128, for designation of a temporal reference designator point, with respect to which a temporal referenced ending designator designates the ending of a pre-specified ending time period of three seconds later, of a six-second portion of a video and/or audio data stream from the digital video camera 106 for retention in data storage at a resolution sufficient to reproduce the original video and/or audio at relatively high resolution).

Operation 308 depicts accepting input to confirm an aspect of the designation of the first portion of the data stream for the retention at the first resolution (e.g., accepting input, via the digital video camera 102 and/or the digital video camera 106 and/or the sensor 114 and/or the sensor 116 and/or the processor 126 and/or processing logic 128, for confirmation of a selected temporal beginning designator of the beginning of a ten-second portion of a video and/or audio data stream from the digital video camera 102 for retention in data storage at a resolution sufficient to reproduce the original video and/or audio at relatively high resolution).

Operation 310 illustrates accepting input for designation of a value for the first resolution (e.g., accepting input, via the digital video camera 102 and/or the digital video camera 106 and/or the sensor 114 and/or the sensor 116 and/or the processor 126 and/or processing logic 128, for designation of a retention resolution of 1.00 MB/second, and/or of 95% of data present, of a ten-second portion of a video and/or audio data stream from the digital video camera 102 for retention in data storage at relatively high resolution).

Operation 312 shows accepting input for designation of audio data for inclusion in the first portion of the data stream (e.g., accepting input, via the digital video camera 102 and/or the digital video camera 106 and/or the sensor 114 and/or the sensor 116 and/or the processor 126 and/or processing logic 128, for designation of video of a seven-second portion of a video and/or audio data stream from the digital video camera 102 to be retained in data storage at relatively high resolution).

Operation 314 depicts accepting input for designation of video data for inclusion in the first portion of the data stream (e.g., accepting input, via the digital video camera 102 and/or the digital video camera 106 and/or the sensor 114 and/or the sensor 116 and/or the processor 126 and/or processing logic 128, for designation of audio of a two-minute portion of a video and/or audio data stream from the digital video camera 102 to be retained in data storage at relatively high resolution).

Operation 316 illustrates accepting input for designation of a first portion of a live and/or a substantially live data stream for the retention at the first resolution (e.g., accepting input, via the digital video camera 102 and/or the digital video camera 106 and/or the sensor 114 and/or the sensor 116 and/or the processor 126 and/or processing logic 128, for designation of a three-second portion of a video and/or audio data stream from the digital video camera 106 for retention in data storage to reproduce the original video and/or audio at relatively high resolution, where the data stream is originating from the digital video camera 106 as, or substantially as (e.g., with a minimal delay), the data is being detected and/or recorded and/or transmitted).

Operation 318 shows accepting input for designation of a first portion of a retained data stream for the retention at the first resolution (e.g., accepting input, via the digital video camera 102 and/or the digital video camera 106 and/or the sensor 14 and/or the sensor 116 and/or the processor 126 and/or processing logic 128, for designation of a three-second portion of a video and/or audio data stream from the digital video camera 106 for retention in data storage to reproduce the original video and/or audio at relatively high resolution, where the data stream is originating from the digital video camera 106 as, or substantially as, the data is being played backed from data storage).

Operation 320 depicts accepting tactile input (e.g., accepting input, via the digital video camera 102 and/or the digital video camera 106 and/or the sensor 114 and/or the sensor 116 and/or the processor 126 and/or processing logic 128, for designation of a one minute portion of a video and/or audio data stream from the digital video camera 102 for retention in data storage to reproduce the original video and/or audio at relatively high resolution, where the input is initiated by a user 130 mechanically manipulating an interface device and/or feature).

Operation 322 illustrates accepting sonic input (e.g., accepting input, via the digital video camera 102 and/or the digital video camera 106 and/or the sensor 114 and/or the sensor 116 and/or the processor 126 and/or processing logic 128, for designation of a twelve-second portion of a video and/or audio data stream from the digital video camera 106 for retention in data storage to reproduce the original video and/or audio at relatively high resolution, where the input is initiated by a user 130 speaking into an interface device and/or feature).

Operation 324 shows accepting visual input (e.g., accepting input, via the digital video camera 102 and/or the digital video camera 106 and/or the sensor 114 and/or the sensor 116 and/or the processor 126 and/or processing logic 128, for designation of a four-minute portion of a video and/or audio data stream from the digital video camera 102 for retention in data storage to reproduce the original video and/or audio at relatively high resolution, where the input is initiated by a user 130 interacting with a video input device such as a camera and/or a visual component of a graphical user interface).

Operation 326 illustrates accepting input for designation of a first frequency range characteristic (e.g., accepting input, via the digital video camera 102 and/or the digital video camera 106 and/or the sensor 114 and/or the sensor 116 and/or the processor 126 and/or processing logic 128, for designation of a lower end of 100 Hz for audio data to be retained at relatively high resolution from a specified portion of a video and/or audio data stream).

Operation 328 shows accepting input for designation of a first frequency distribution characteristic (e.g., accepting input, via the digital video camera 102 and/or the digital video camera 106 and/or the sensor 114 and/or the sensor 116 and/or the processor 126 and/or processing logic 128, for designation of the frequency distribution characteristic of a particular human voice to be retained at relatively high resolution from a specified portion of a video/and/or audio data stream).

Figure 4:
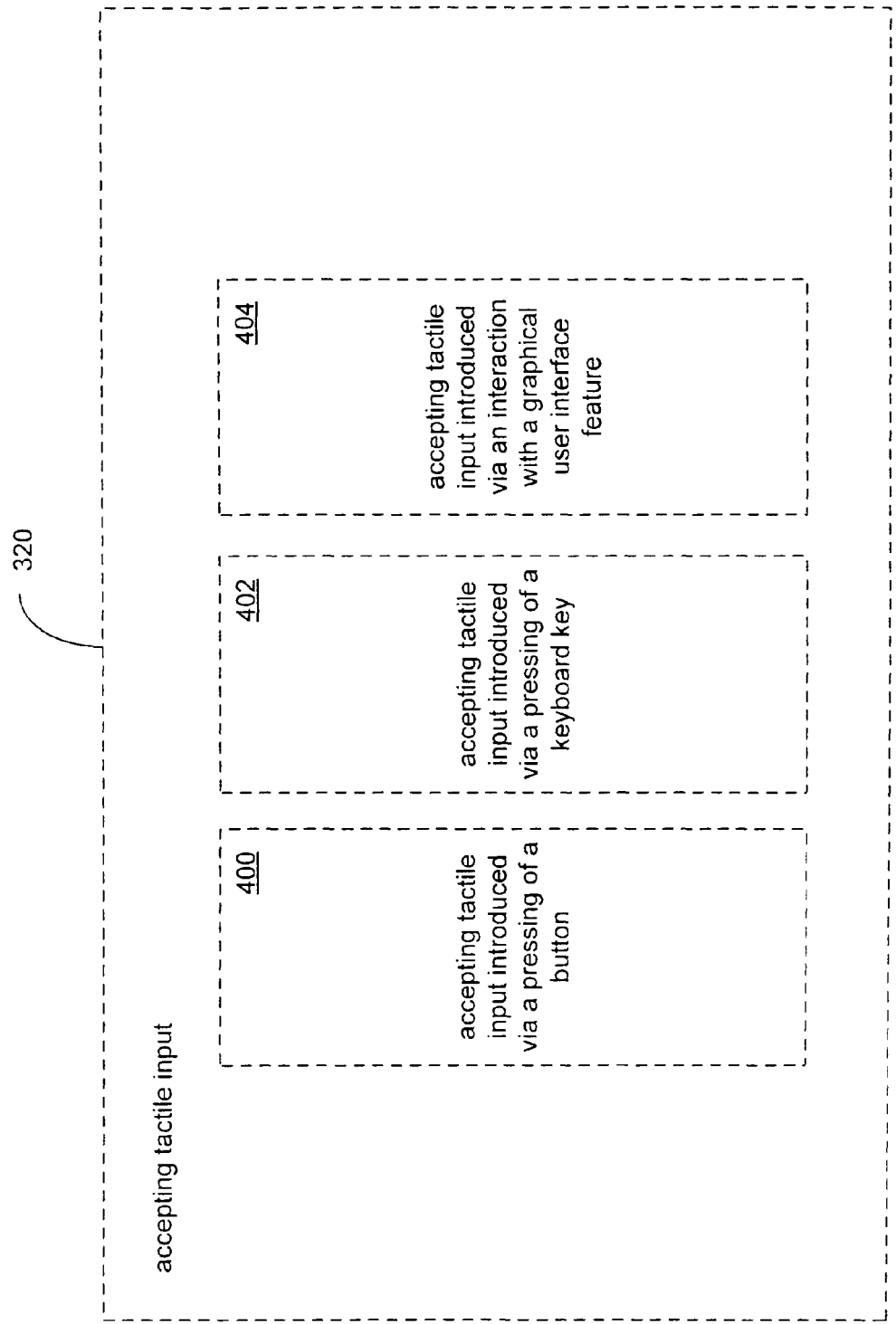
FIG. 4 shows several alternative implementations of the high-level logic flowchart of FIG. 3.

FIG. 4 shows several alternative implementations of the high-level logic flowchart of FIG. 3. Operation 320—accepting tactile input—may include one or more of the following operations: 400, 402, and/or 404.

Operation 400 shows accepting tactile input introduced via a pressing of a button (e.g., accepting input, via the digital video camera 102 and/or the digital video camera 106 and/or the sensor 114 and/or the sensor 116 and/or the processor 126 and/or processing logic 128, for designation of a one-minute portion of a video and/or audio data stream from the digital video camera 102 for retention in data storage to reproduce the original video and/or audio at relatively high resolution, where the input is initiated by a user 130 mechanically manipulating a button on a mouse input device).

Operation 402 depicts accepting tactile input introduced via a pressing of a keyboard key (e.g., accepting input, via the digital video camera 102 and/or the digital video camera 106 and/or the sensor 114 and/or the sensor 116 and/or the processor 126 and/or processing logic 128, for designation of a forty-second portion of a video and/or audio data stream from the digital video camera 106 for retention in data storage to reproduce the original video and/or audio at relatively high resolution, where the input is initiated by a user 130 mechanically manipulating a computer keyboard key).

Operation 404 illustrates accepting tactile input introduced via an interaction with a graphical user interface feature (e.g., accepting input, via the digital video camera 102 and/or the digital video camera 106 and/or the sensor 114 and/or the sensor 116 and/or the processor 126 and/or processing logic 128, for designation of a three-second portion of a video and/or audio data stream from the digital video camera 102 for retention in data storage to reproduce the original video and/or audio at relatively high resolution, where the input is initiated by a user 130 mechanically interacting with a button included in a graphical user interface).

Figure 5:
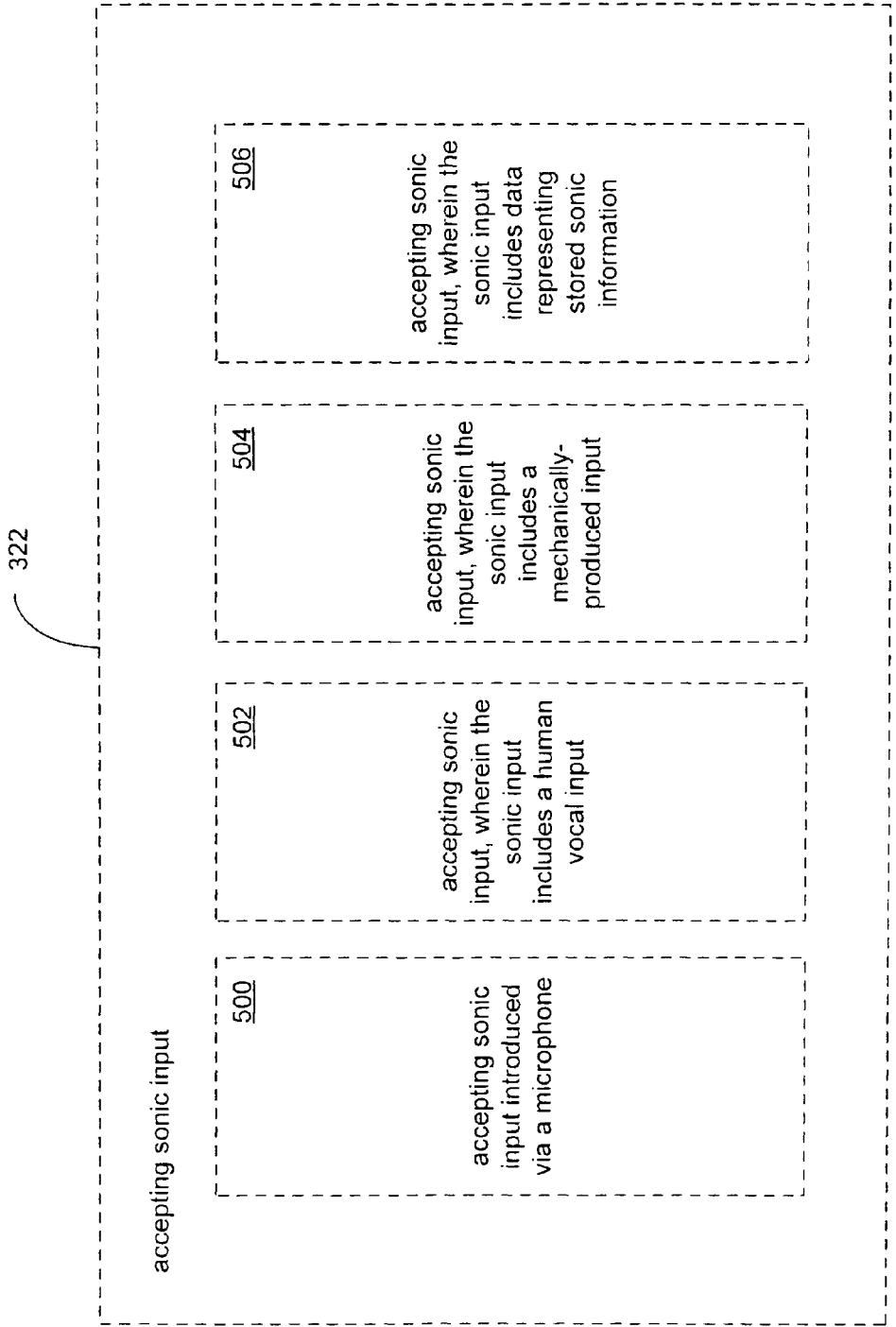
FIG. 5 shows several alternative implementations of the high-level logic flowchart of FIG. 3.

FIG. 5 shows several alternative implementations of the high-level logic flowchart of FIG. 3. Operation 322—accepting sonic input—may include one or more of the following operations: 500, 502, 504, and/or 506.

Operation 500 shows accepting sonic input introduced via a microphone (e.g., accepting input, via the digital video camera 102 and/or the digital video camera 106 and/or the sensor 114 and/or the sensor 116 and/or the processor 126 and/or processing logic 128, for designation of a ten-second portion of a video and/or audio data stream from the digital video camera 106 for retention in data storage to reproduce the original video and/or audio at relatively high resolution, where the input is initiated by a user 130 causing a sound to be made that is detected by a microphone).

Operation 502 depicts accepting sonic input, wherein the sonic input includes a human vocal input (e.g., accepting input, via the digital video camera 102 and/or the digital video camera 106 and/or the sensor 114 and/or the sensor 116 and/or the processor 126 and/or processing logic 128, for designation of a ten-second portion of a video and/or audio data stream from the digital video camera 106 for retention in data storage to reproduce the original video and/or audio at relatively high resolution, where the input is initiated by a user 130 speaking into a microphone).

Operation 504 illustrates accepting sonic input, wherein the sonic input includes a mechanically-produced input (e.g., accepting input, via the digital video camera 102 and/or the digital video camera 106 and/or the sensor 114 and/or the sensor 116 and/or the processor 126 and/or processing logic 128, for designation of a two-second portion of a video and/or audio data stream from the digital video camera 102 for retention in data storage to reproduce the original video and/or audio at relatively high resolution, where the input is initiated by a user 130 causing a sound to be made with a speaker).

Operation 506 shows accepting sonic input, wherein the sonic input includes data representing stored sonic information (e.g., accepting input, via the digital video camera 102 and/or the digital video camera 106 and/or the sensor 114 and/or the sensor 116 and/or the processor 126 and/or processing logic 128, for designation of a one-minute portion of a video and/or audio data stream from the digital video camera 102 for retention in data storage to reproduce the original video and/or audio at relatively high resolution, where the input is initiated by a playback of a recording of a user 130 speaking into a microphone).

Figure 6:
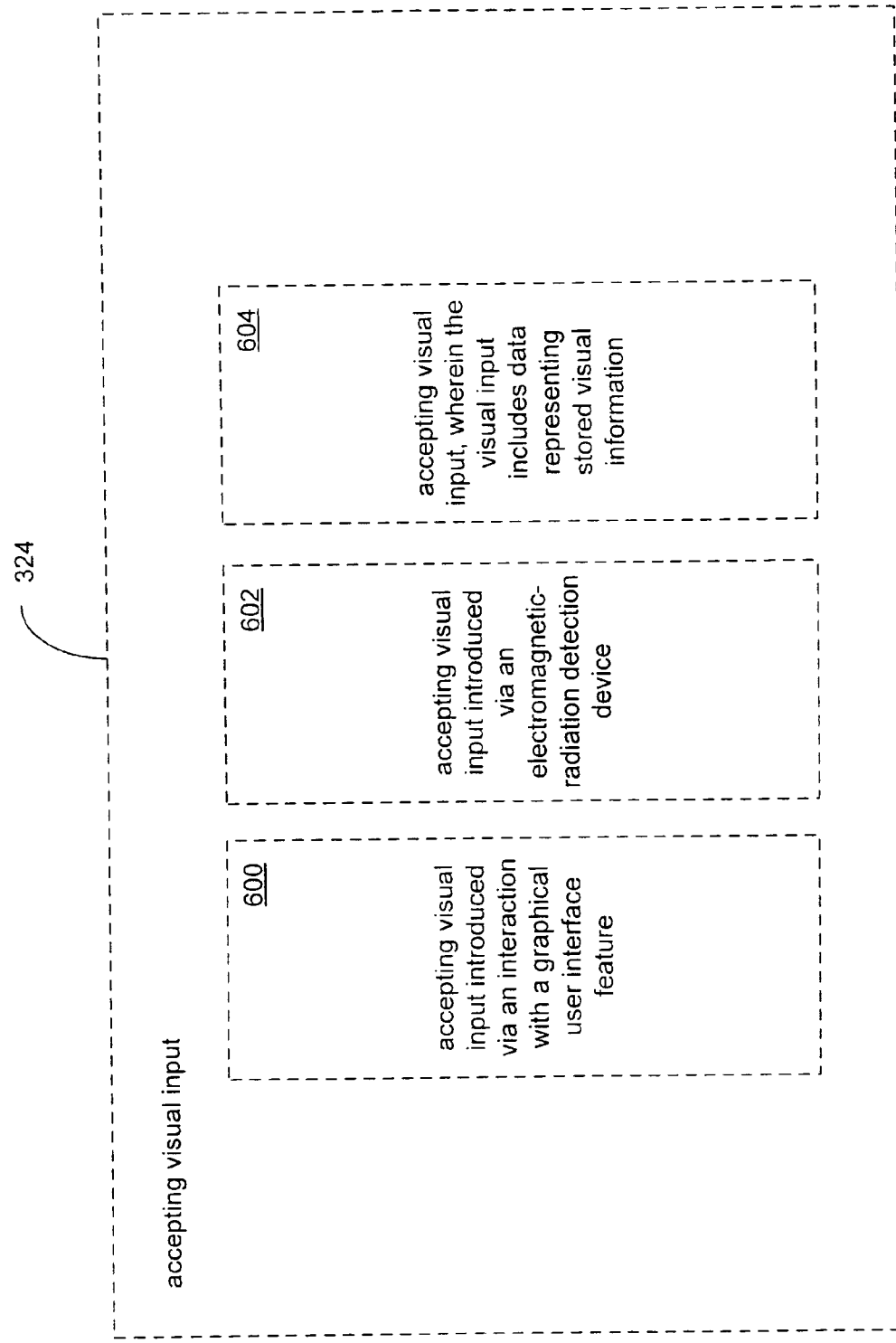
FIG. 6 shows several alternative implementations of the high-level logic flowchart of FIG. 3.

FIG. 6 shows several alternative implementations of the high-level logic flowchart of FIG. 3. Operation 324—accepting visual input—may include one or more of the following operations: 600, 602, and/or 604.

Operation 600 shows accepting visual input introduced via an interaction with a graphical user interface feature (e.g., accepting input, via the digital video camera 102 and/or the digital video camera 106 and/or the sensor 114 and/or the sensor 116 and/or the processor 126 and/or processing logic 128, for designation of a five-second portion of a video and/or audio data stream from the digital video camera 102 for retention in data storage to reproduce the original video and/or audio at relatively high resolution, where the input is initiated by a user 130 interacting with a button included in a visual presentation of a graphical user interface).

Operation 602 depicts accepting visual input introduced via an electromagnetic-radiation detection device (e.g., accepting input, via the digital video camera 102 and/or the digital video camera 106 and/or the sensor 114 and/or the sensor 116 and/or the processor 126 and/or processing logic 128, for designation of a five-second portion of a video and/or audio data stream from the digital video camera 102 for retention in data storage to reproduce the original video and/or audio at relatively high resolution, where the input is initiated by a user 130 making a sign that is detected by a camera).

Operation 604 illustrates accepting visual input, wherein the visual input includes data representing stored visual information (e.g., accepting input, via the digital video camera 102 and/or the digital video camera 106 and/or the sensor 114 and/or the sensor 116 and/or the processor 126 and/or processing logic 128, for designation of a five-second portion of a video and/or audio data stream from the digital video camera 102 for retention in data storage to reproduce the original video and/or audio at relatively high resolution, where the input is initiated by a playback of a video recording of a user 130 making a sign that is detected by a camera).

Figure 7B:
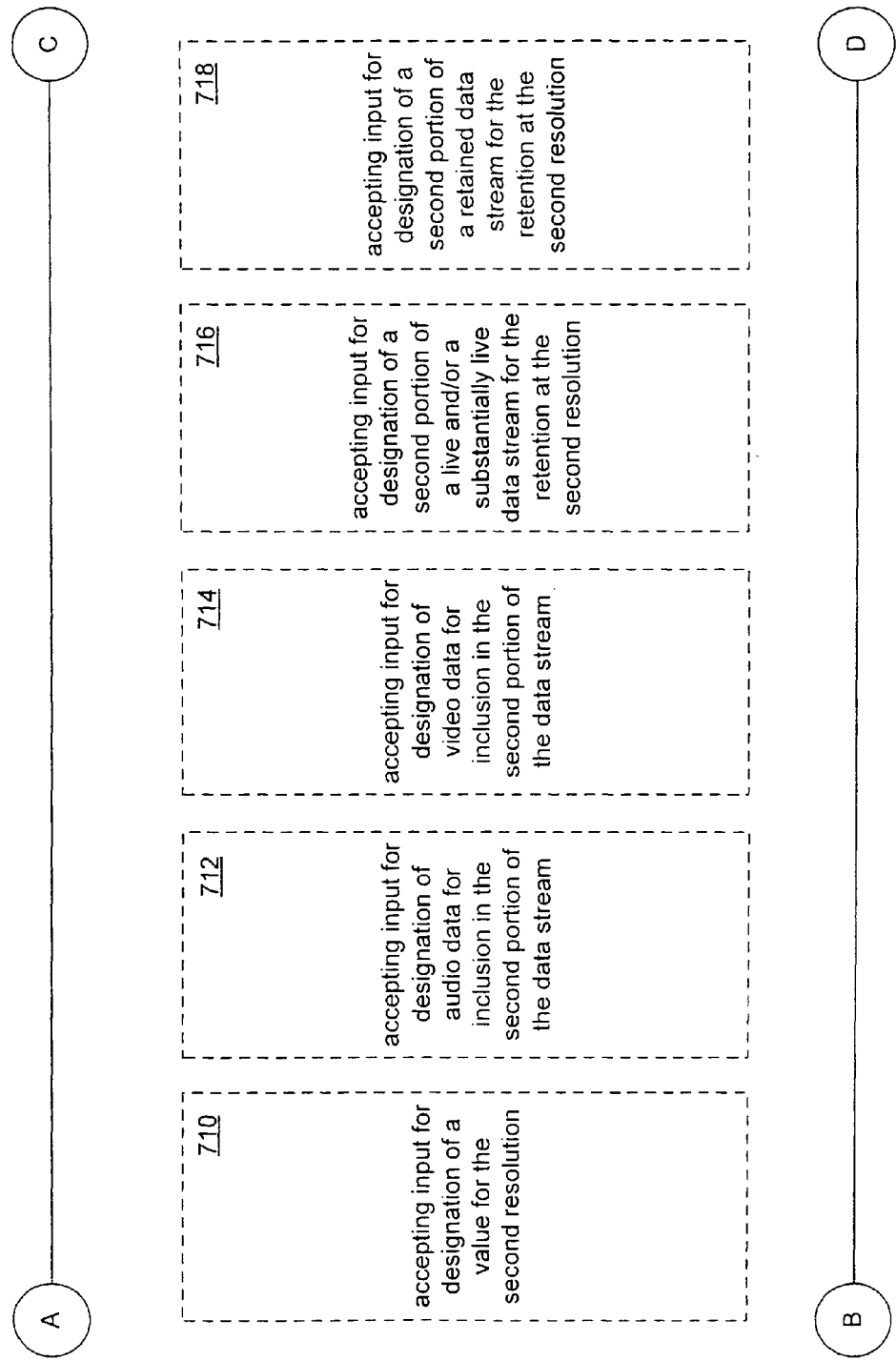
FIG. 7 illustrates several alternative implementations of the high-level logic flowchart of FIG. 2.

FIG. 7 illustrates several alternative implementations of the high-level logic flowchart of FIG. 2. Operation 202—accepting input for designation of a second portion of the data stream for retention at a second resolution, wherein the second resolution is less than the first resolution, and wherein the retention of the second portion of the data stream at the second resolution is to be performed if a condition is met—may include one or more of the following operations: 700, 702, 704, 706, 708, 710, 712, 714, 716, 718, 720, 722, 724, 726, 728, and/or 730.

Operation 700 illustrates accepting input for designation of a second temporal beginning designator in the data stream for the retention of the second portion of the data stream at the second resolution (e.g., accepting input, via the digital video camera 102 and/or the digital video camera 106 and/or the sensor 114 and/or the sensor 116 and/or the processor 126 and/or processing logic 128, for designation of a temporal beginning designator of the beginning of a portion of a video and/or audio data stream including a particular person's voice, from the digital video camera 106, for retention in data storage at a resolution sufficient to reproduce the original video and/or audio at a relatively low resolution).

Operation 702 shows accepting input for designation of a second temporal ending designator in the data stream for the retention of the second portion of the data stream at the second resolution (e.g., accepting input, via the digital video camera 102 and/or the digital video camera 106 and/or the sensor 114 and/or the sensor 116 and/or the processor 126 and/or processing logic 128, for designation of a temporal ending designator of the ending of a portion of a video and/or audio data stream including video/imagery data of a cube 122 of particular interest, from the digital video camera 106, for retention in data storage to reproduce the original video and/or audio at relatively low resolution).

Operation 704 depicts accepting input for designation of a second temporal reference designator in the data stream, wherein a second temporal referenced beginning designator in the data stream for the retention of the second portion of the data stream at the second resolution is at a second pre-specified beginning time period from the second temporal reference designator (e.g., accepting input, via the digital video camera 102 and/or the digital video camera 106 and/or the sensor 114 and/or the sensor 16 and/or the processor 126 and/or processing logic 128, for designation of a temporal reference designator, with respect to which a temporal referenced beginning designator designates the beginning of a pre-specified beginning time period of three seconds earlier, of a six-second portion of a video and/or audio data stream from the digital video camera 106 for retention in data storage to reproduce the original video and/or audio at relatively low resolution).

Operation 706 depicts accepting input for designation of a second temporal reference designator in the data stream, wherein a second temporal referenced ending designator in the data stream for the retention of the second portion of the data stream at the second resolution is at a second pre-specified ending time period from the second temporal reference designator (e.g., accepting input, via the digital video camera 102 and/or the digital video camera 106 and/or the sensor 114 and/or the sensor 116 and/or the processor 126 and/or processing logic 128, for designation of a temporal reference designator point, with respect to which a temporal referenced ending designator designates the ending of a pre-specified ending time period of three seconds later, of a six-second portion of a video and/or audio data stream from the digital video camera 106 for retention in data storage to reproduce the original video and/or audio at relatively low resolution).

Operation 708 shows accepting input to confirm an aspect of the designation of the second portion of the data stream for the retention at the second resolution (e.g., accepting input, via the digital video camera 102 and/or the digital video camera 106 and/or the sensor 114 and/or the sensor 116 and/or the processor 126 and/or processing logic 128, for confirmation of a selected temporal reference designator of a portion of a video and/or audio data stream, including an audio aspect of a vehicle, from the digital video camera 102, for retention in data storage to reproduce the original video and/or audio at relatively low resolution).

Operation 710 illustrates accepting input for designation of a value for the second resolution (e.g., accepting input, via the digital video camera 102 and/or the digital video camera 106 and/or the sensor 114 and/or the sensor 116 and/or the processor 126 and/or processing logic 128, for designation of a retention resolution of 12 kB/second, and/or of 5% of data present, of a portion of a video and/or audio data stream including a musical phrase of interest, from the digital video camera 102, for retention in data storage at relatively low resolution).

Operation 712 illustrates accepting input for designation of audio data for inclusion in the second portion of the data stream (e.g., accepting input, via the digital video camera 102 and/or the digital video camera 106 and/or the sensor 114 and/or the sensor 116 and/or the processor 126 and/or processing logic 128, for designation of video of a seven-second portion of a video and/or audio data stream from the digital video camera 102 to be retained in data storage at relatively low resolution).

Operation 714 depicts accepting input for designation of video data for inclusion in the second portion of the data stream (e.g., accepting input, via the digital video camera 102 and/or the digital video camera 106 and/or the sensor 114 and/or the sensor 116 and/or the processor 126 and/or processing logic 128, for designation of audio of a portion of a video and/or audio data stream including an audio aspect of video/imagery/audio aspects of a particular person, from the digital video camera 102, to be retained in data storage at relatively low resolution).

Operation 716 depicts accepting input for designation of a second portion of a live and/or a substantially live data stream for the retention at the second resolution (e.g., accepting input, via the digital video camera 102 and/or the digital video camera 106 and/or the sensor 114 and/or the sensor 116 and/or the processor 126 and/or processing logic 128, for designation of a portion of a video and/or audio data stream including a video/imagery aspect of a particular building of interest, from the digital video camera 106, for retention in data storage to reproduce the original video and/or audio at relatively low resolution, where the data stream is originating from the digital video camera 106 as, or substantially as (e.g., with a minimal delay), the data is being detected and/or recorded and/or transmitted).

Operation 718 shows accepting input for designation of a second portion of a retained data stream for the retention at the second resolution (e.g., accepting input, via the digital video camera 102 and/or the digital video camera 106 and/or the sensor 114 and/or the sensor 116 and/or the processor 126 and/or processing logic 128, for designation of a portion of a video and/or audio data stream including a human voice of interest, from the digital video camera 106, for retention in data storage to reproduce the original video and/or audio at relatively low resolution, where the data stream is originating from the digital video camera 106 as, or substantially as, the data is being played back from data storage).

Operation 720 illustrates accepting tactile input (e.g., accepting input, via the digital video camera 102 and/or the digital video camera 106 and/or the sensor 114 and/or the sensor 116 and/or the processor 126 and/or processing logic 128, for designation of a one minute portion of a video and/or audio data stream from the digital video camera 102 for retention in data storage to reproduce the original video and/ or audio at relatively low resolution, where the input is initiated by a user 130 mechanically manipulating an interface device and/or feature).

Operation 722 depicts accepting sonic input (e.g., accepting input, via the digital video camera 102 and/or the digital video camera 106 and/or the sensor 114 and/or the sensor 116 and/or the processor 126 and/or processing logic 128, for designation of a portion of a video and/or audio data stream including an image of a person of interest, from the digital video camera 106, for retention in data storage to reproduce the original video and/or audio at relatively low resolution, where the input is initiated by a user 130 speaking into an interface device and/or feature).

Operation 724 shows accepting visual input (e.g., accepting input, via the digital video camera 102 and/or the digital video camera 106 and/or the sensor 114 and/or the sensor 116 and/or the processor 126 and/or processing logic 128, for designation of a four-minute portion of a video and/or audio data stream from the digital video camera 102 for retention in data storage to reproduce the original video and/or audio at relatively low resolution, where the input is initiated by a user 130 interacting with a video input device such as a camera and/or a visual component of a graphical user interface).

Operation 726 illustrates accepting input for designation of a second frequency range characteristic (e.g., accepting input, via the digital video camera 102 and/or the digital video camera 106 and/or the sensor 114 and/or the sensor 116 and/or the processor 126 and/or processing logic 128, for designation of a relatively lower end of 20 kHz for audio data to be retained at relatively low resolution from a specified portion of a video and/or audio data stream).

Operation 728 depicts accepting input for designation of a second frequency distribution characteristic (e.g., accepting input, via the digital video camera 102 and/or the digital video camera 106 and/or the sensor 114 and/or the sensor 116 and/or the processor 126 and/or processing logic 128, for designation of the frequency distribution characteristic of a particular human voice to be retained at relatively low resolution from a specified portion of a video/and/or audio data stream).

Operation 730 shows accepting input for the designation of the second portion of the data stream for the retention at the second resolution, wherein the second resolution is less than the first resolution, and wherein the retention of the second portion of the data stream at the second resolution is to be performed if an available storage space is less than a preselected amount. Operation 730 may include, for example accepting input, via the digital video camera 102 and/or the digital video camera 106 and/or the sensor 114 and/or the sensor 116 and/or the processor 126 and/or processing logic 128, for designation of a low-priority portion of a video/audio data stream for retention at a relatively low resolution, including a resolution of zero (e.g., including deletion or non-storage of the low-priority portion) if one or more available storage spaces provide less than a preselected amount of storage space, e.g., less than 1 GB, such that more storage space is made available for a high-priority portion of the video/audio stream to be retained at a relatively high resolution.

Figure 8:
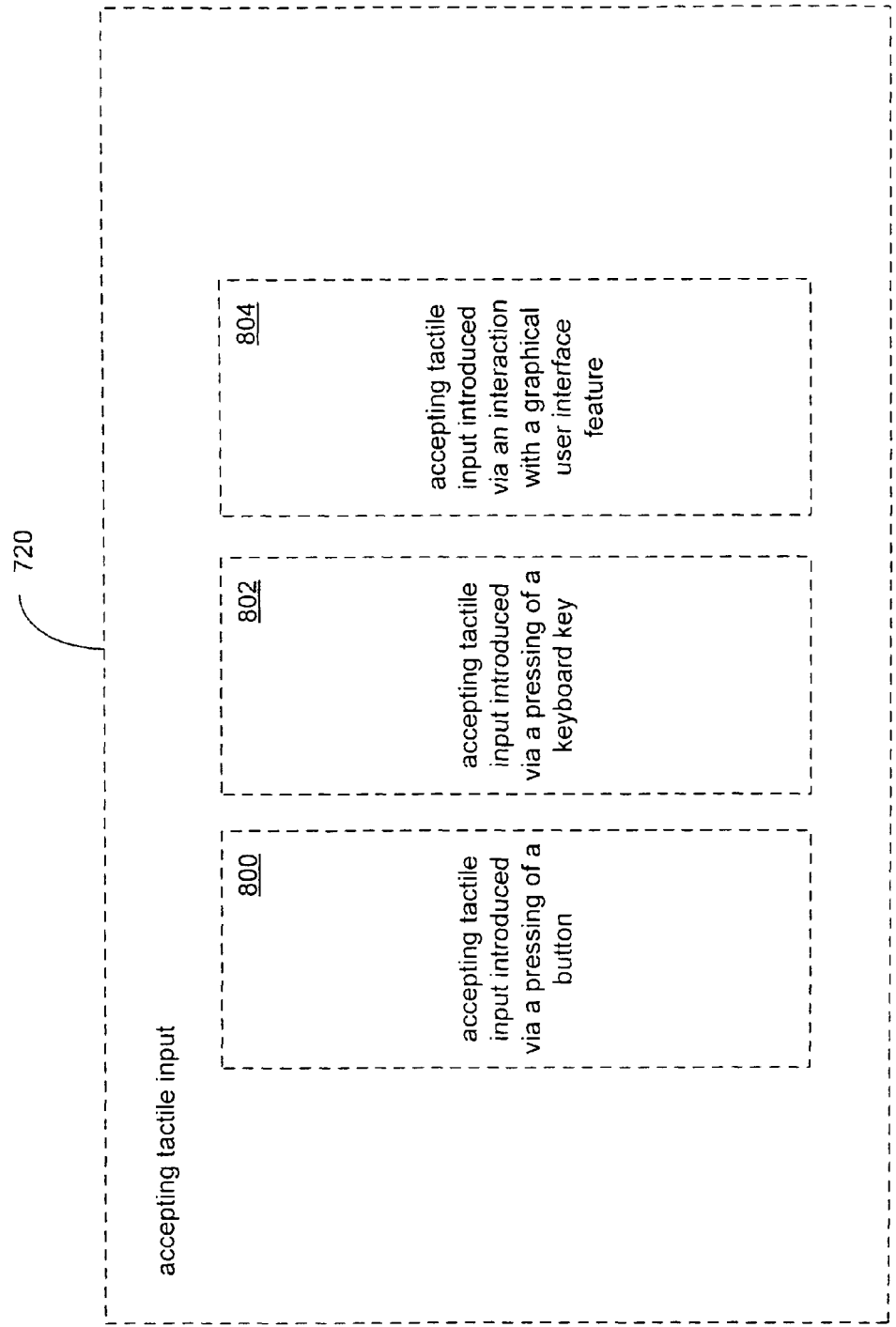
FIG. 8 shows several alternative implementations of the high-level logic flowchart of FIG. 7.

FIG. 8 shows several alternative implementations of the high-level logic flowchart of FIG. 7. Operation 720—accepting tactile input—may include one or more of the following operations: 800, 802, and/or 804.

Operation 800 illustrates accepting tactile input introduced via a pressing of a button. (e.g., accepting input, via the digital video camera 102 and/or the digital video camera 106 and/or the sensor 114 and/or the sensor 116 and/or the processor 126 and/or processing logic 128, for designation of a portion of a video and/or audio data stream including a group of three human voices of interest, from the digital video camera 102, for retention in data storage to reproduce the original video and/or audio at relatively low resolution, where the input is initiated by a user 130 mechanically manipulating a button on a mouse input device).

Operation 802 shows accepting tactile input introduced via a pressing of a keyboard key. (e.g., accepting input, via the digital video camera 102 and/or the digital video camera 106 and/or the sensor 114 and/or the sensor 116 and/or the processor 126 and/or processing logic 128, for designation of a forty-second portion of a video and/or audio data stream from the digital video camera 106 for retention in data storage to reproduce the original video and/or audio at relatively low resolution, where the input is initiated by a user 130 mechanically manipulating a computer keyboard key).

Operation 804 depicts accepting tactile input introduced via an interaction with a graphical user interface feature (e.g., accepting input, via the digital video camera 102 and/or the digital video camera 106 and/or the sensor 114 and/or the sensor 116 and/or the processor 126 and/or processing logic 128, for designation of a portion of a video and/or audio data stream including imagery aspects of a building of interest from the digital video camera 102 for retention in data storage to reproduce the original video and/or audio at relatively low resolution, where the input is initiated by a user 130 mechanically interacting with a button included in a graphical user interface).

Figure 9:
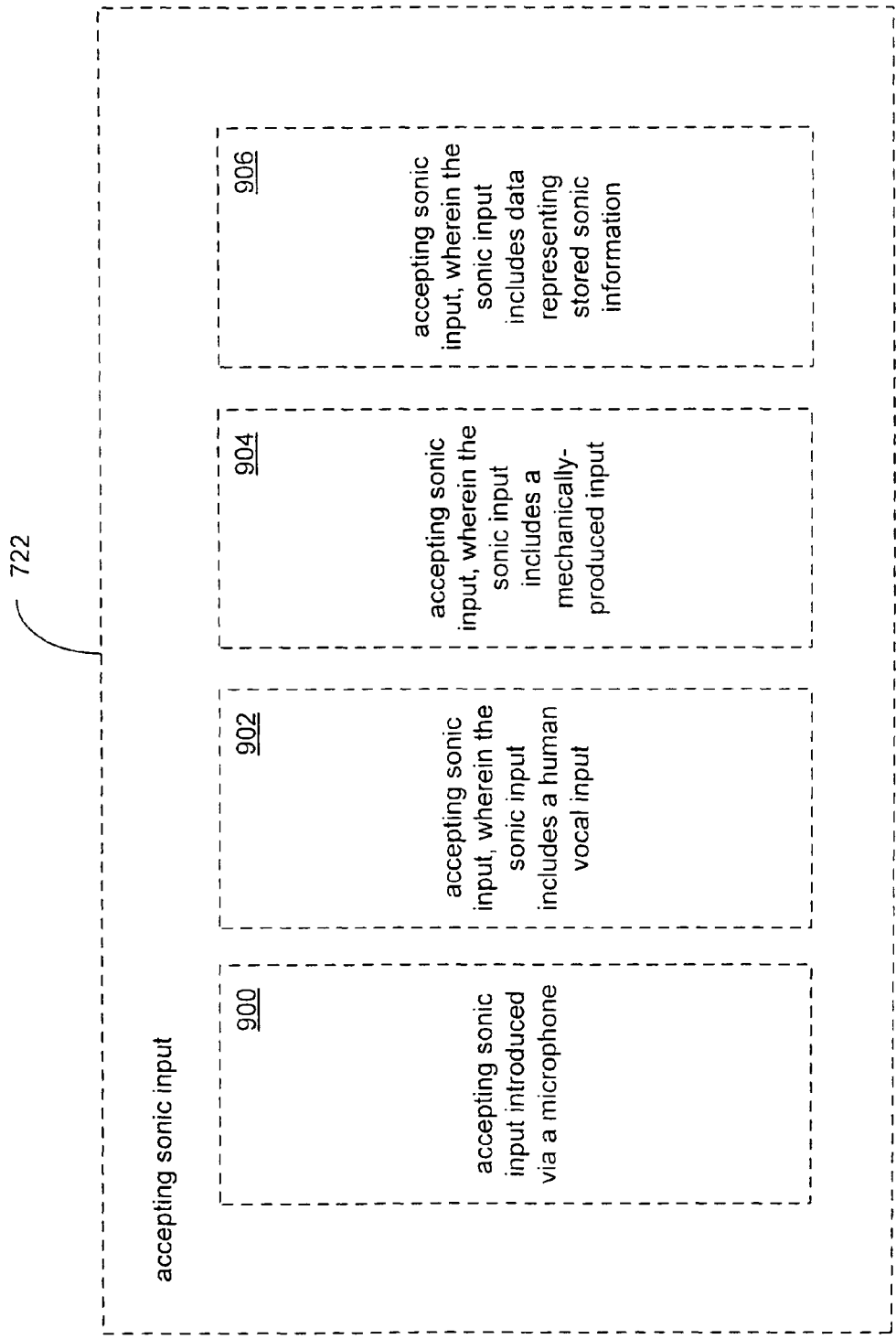
FIG. 9 illustrates several alternative implementations of the high-level logic flowchart of FIG. 7.

FIG. 9 illustrates several alternative implementations of the high-level logic flowchart of FIG. 7. Operation 722—accepting sonic input—may include one or more of the following operations: 900, 902, 904, and/or 906.

Operation 900 shows accepting sonic input introduced via a microphone (e.g., accepting input, via the digital video camera 102 and/or the digital video camera 106 and/or the sensor 114 and/or the sensor 116 and/or the processor 126 and/or processing logic 128, for designation of a ten-second portion of a video and/or audio data stream from the digital video camera 106 for retention in data storage to reproduce the original video and/or audio at relatively low resolution, where the input is initiated by a user 130 causing a sound to be made that is detected by a microphone).

Operation 902 depicts accepting sonic input, wherein the sonic input includes a human vocal input (e.g., accepting input, via the digital video camera 102 and/or the digital video camera 106 and/or the sensor 114 and/or the sensor 116 and/or the processor 126 and/or processing logic 128, for designation of a ten-second portion of a video and/or audio data stream from the digital video camera 106 for retention in data storage to reproduce the original video and/or audio at relatively low resolution, where the input is initiated by a user 130 speaking into a microphone).

Operation 904 illustrates accepting sonic input, wherein the sonic input includes a mechanically-produced input (e.g., accepting input, via the digital video camera 102 and/or the digital video camera 106 and/or the sensor 114 and/or the sensor 116 and/or the processor 126 and/or processing logic 128, for designation of a portion of a video and/or audio data stream including the voice and image of a person of interest, from the digital video camera 102, for retention in data storage to reproduce the original video and/or audio at relatively low resolution, where the input is initiated by a user 130 causing a sound to be made with a speaker).

Operation 906 illustrates accepting sonic input, wherein the sonic input includes data representing stored sonic information (e.g., accepting input, via the digital video camera 102 and/or the digital video camera 106 and/or the sensor 114 and/or the sensor 116 and/or the processor 126 and/or processing logic 128, for designation of a one-minute portion of a video and/or audio data stream from the digital video camera 102 for retention in data storage to reproduce the original video and/or audio at relatively low resolution, where the input is initiated by a playback of a recording of a user 130 speaking into a microphone).

Figure 10:
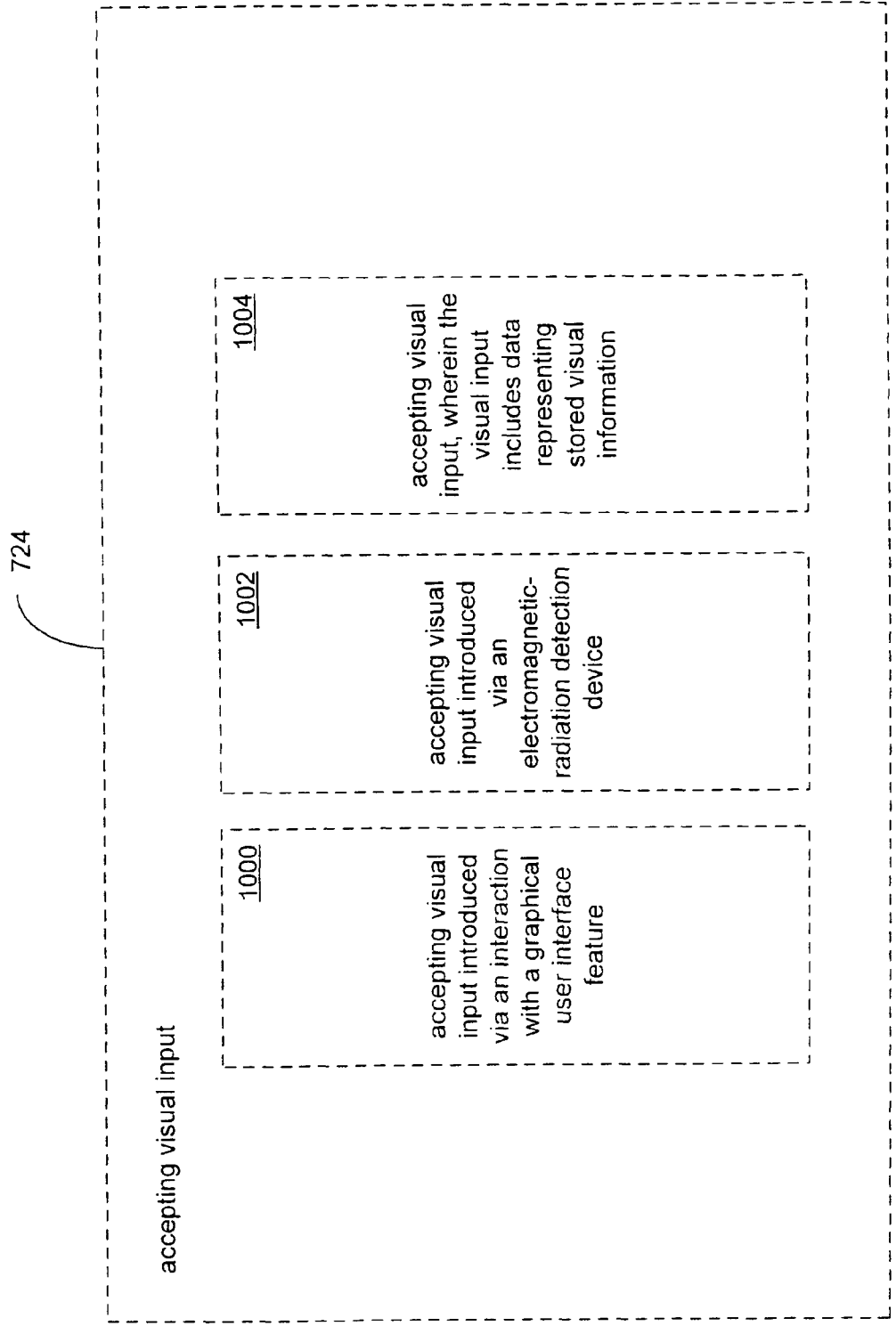
FIG. 10 depicts several alternative implementations of the high-level logic flowchart of FIG. 7.

FIG. 10 depicts several alternative implementations of the high-level logic flowchart of FIG. 7. Operation 724—accepting visual input—may include one or more of the following operations: 1000, 1002, and/or 1004.

Operation 1000 shows accepting visual input introduced via an interaction with a graphical user interface feature (e.g., accepting input, via the digital video camera 102 and/or the digital video camera 106 and/or the sensor 114 and/or the sensor 116 and/or the processor 126 and/or processing logic 128, for designation of a portion of a video and/or audio data stream including an image and call of a bird of interest, from the digital video camera 102, for retention in data storage to reproduce the original video and/or audio at relatively low resolution, where the input is initiated by a user 130 interacting with a button included in a visual presentation of a graphical user interface).

Operation 1002 shows accepting visual input introduced via an electromagnetic-radiation detection device (e.g., accepting input, via the digital video camera 102 and/or the digital video camera 106 and/or the sensor 114 and/or the sensor 116 and/or the processor 126 and/or processing logic 128, for designation of a two-minute portion of a video and/or audio data stream from the digital video camera 102 for retention in data storage to reproduce the original video and/or audio at relatively low resolution, where the input is initiated by a user 130 making a sign that is detected by a camera). It should be understood that visual input is not limited to the visual spectrum of a human, but also may include virtually any portion of the electromagentic spectrum that a machine and/or an apparatus is capable of detecting. It should also be understood that examples of visual input may include but are not limited to gestural input, detection of captured electromagnetic spectrum data indicative of a motion of a capturing device (e.g., such as might be detected if a camera were moved in a predefined way). It should also be understood that a sign may include but is not limited to a static sign (e.g., holding up a victory sign with two fingers and/or holding up a printed sign that says "now"), and/or a dynamic sign (e.g., something like clapping or waving).

Operation 1004 depicts accepting visual input, wherein the visual input includes data representing stored visual information (e.g., accepting input, via the digital video camera 102 and/or the digital video camera 106 and/or the sensor 114 and/or the sensor 116 and/or the processor 126 and/or processing logic 128, for designation of a portion of a video and/or audio data stream including an image of a person of interest, from the digital video camera 102, for retention in data storage to reproduce the original video and/or audio at relatively low resolution, where the input is initiated by a playback of a video recording of a user 130 making a sign that is detected by a camera).

Figure 11:
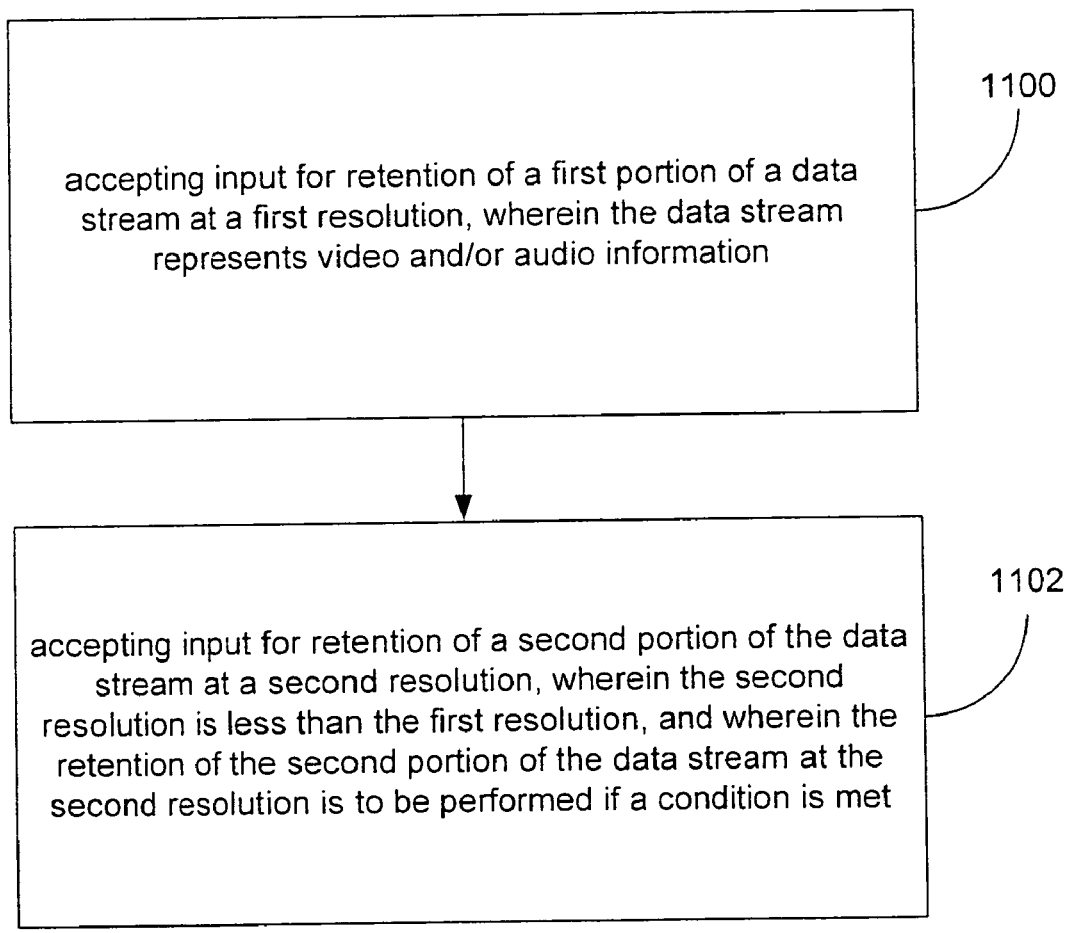
FIG. 11 shows a high-level logic flowchart of an operational process.

FIG. 11 shows a high-level logic flowchart of an operational process. The illustrated operational process may include operation 1100 and/or 1102.

Operation 1100 depicts accepting input for retention of a first portion of a data stream at a first resolution, wherein the data stream represents video and/or audio information. For example, operation 1100 may include accepting input, via the digital video camera 102 and/or the digital video camera 106 and/or the sensor 114 and/or the sensor 116 and/or the processor 126 and/or processing logic 128, for retention at a high resolution a portion of a video/audio data stream including a conversation between two particular people of interest to users 104, 110, 118, and/or 130.

Operation 1102 shows accepting input for retention of a second portion of the data stream at a second resolution, wherein the second resolution is less than the first resolution, and wherein the retention of the second portion of the data stream at the second resolution is to be performed if a condition is met. For example, operation 1102 may include accepting input, via the digital video camera 102 and/or the digital video camera 106 and/or the sensor 114 and/or the sensor 116 and/or the processor 126 and/or processing logic 128, for retention at a relatively low resolution a portion of a video/audio data stream including relative silences and conversations by persons of no particular interest to users 104, 110, 118, and/or 130.

Figure 12A:
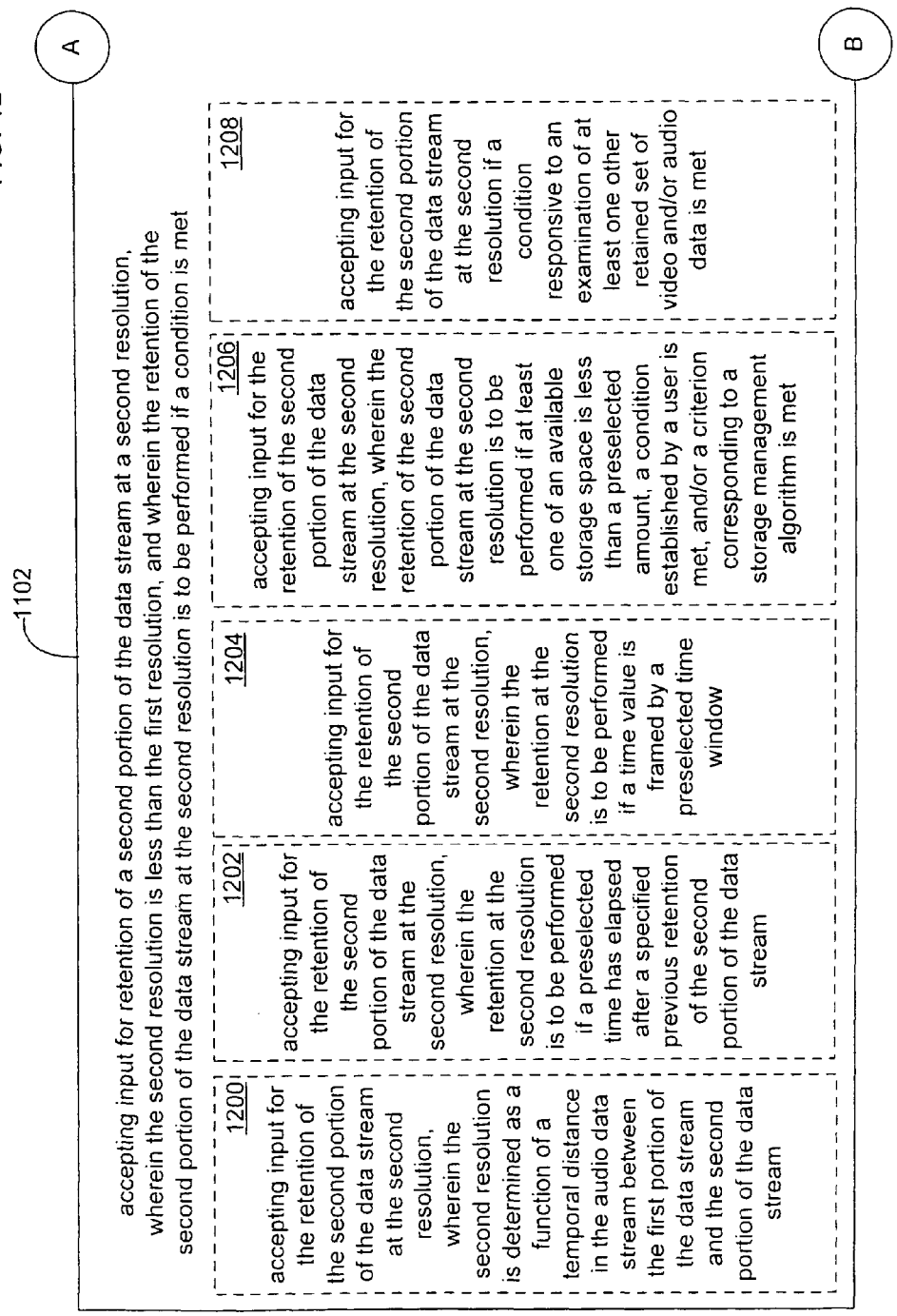
FIG. 12 illustrates several alternative implementations of the high-level logic flowchart of FIG. 11.

FIG. 12 illustrates several alternative implementations of the high-level logic flowchart of FIG. 11. Operation 1100—accepting input for retention of a first portion of a data stream at a first resolution, wherein the data stream represents video and/or audio information—may include one or more of the following operations: 1200, 1202, 1204, 1206, 1208, 1210, 1212, 1214, and/or 1216.

Operation 1200 depicts accepting input for the retention of the second portion of the data stream at the second resolution, wherein the second resolution is determined as a function of a temporal distance in the audio data stream between the first portion of the data stream and the second portion of the data stream. Operation 1200 may include, for example, accepting input, via the digital video camera 102 and/or the digital video camera 106 and/or the sensor 114 and/or the sensor 116 and/or the processor 126 and/or processing logic 128, to retain at a low resolution a portion of a video/audio data stream that is between one minute and two minutes from a portion of the video/audio data stream be retained at high resolution.

Operation 1202 illustrates accepting input for the retention of the second portion of the data stream at the second resolution, wherein the retention at the second resolution is to be performed if a preselected time has elapsed after a specified previous retention of the second portion of the data stream. For example, operation 1202 may include accepting input, via the digital video camera 102 and/or the digital video camera 106 and/or the sensor 114 and/or the sensor 116 and/or the processor 126 and/or processing logic 128, to retain a portion of a video/audio data stream at a relatively low resolution one month after that portion was stored for the first time by a particular user, e.g., user 130.

Operation 1204 shows accepting input for the retention of the second portion of the data stream at the second resolution, wherein the retention at the second resolution is to be performed if a time value is framed by a preselected time window. Operation 1204 may include, for example, accepting input, via the digital video camera 102 and/or the digital video camera 106 and/or the sensor 114 and/or the sensor 116 and/or the processor 126 and/or processing logic 128, to retain a portion of a video/audio data stream at a relatively low resolution when the time between an initial review of the portion by a user 130 and the present time is framed by a preselected time window of one week to one month.

Operation 1206 shows accepting input for the retention of the second portion of the data stream at the second resolution, wherein the retention of the second portion of the data stream at the second resolution is to be performed if at least one of an available storage space is less than a preselected amount, a condition established by a user is met, and/or a criterion corresponding to a storage management algorithm is met. Operation 1206 may include, for example, accepting input, via the digital video camera 102 and/or the digital video camera 106 and/or the sensor 114 and/or the sensor 116 and/or the processor 126 and/or processing logic 128, to retain a portion of a video/audio data stream at a relatively low resolution if an available storage space is less than 100 MB and/or a condition established by user 104, such as the passage of one month from a previous access of the portion, is met, and/or a storage management algorithm criterion, such as no increase in a combined available storage space of across three storage devices in a week, is met.

Operation 1208 depicts accepting input for the retention of the second portion of the data stream at the second resolution if a condition responsive to an examination of at least one other retained set of video and/or audio data is met. For example, operation 1208 may include accepting input, via the digital video camera 102 and/or the digital video camera 106 and/or the sensor 114 and/or the sensor 116 and/or the processor 126 and/or processing logic 128, to retain a portion of a video/audio data stream at a relatively low resolution if, upon examination, it is found that another retained set of video/audio data, contains information that decreases the usefulness of a high-resolution retention of the portion under consideration for retention at low resolution, such as a finding that a first surveillance record of a location does not include any video/audio record of a particular person in a second surveillance record that includes that person, so that there is no interest in retaining the second surveillance record at high resolution, indicating that that second record may be retained at a relatively low resolution.

Operation 1210 illustrates accepting input for the retention of the second portion of the data stream at the second resolution, wherein the retention of the second portion of the data stream at the second resolution is to be performed if a condition is met that is not related to a specified previous retention of the second portion of the data stream. Operation 1210 may include, for example, accepting input, via the digital video camera 102 and/or the digital video camera 106 and/or the sensor 114 and/or the sensor 116 and/or the processor 126 and/or processing logic 128, to retain at a relatively low resolution a portion of a video/audio data stream if that portion of the data stream has not been designated for retention at a relatively high resolution.

Operation 1212 depicts accepting input for the retention of the second portion of the data stream at the second resolution, wherein the retention of the second portion of the data stream at the second resolution is to be performed if a condition responsive to data received from a device other than a device used for a specified previous retention of the second portion of the data stream is met. For example, operation 1212 may include accepting input, via the digital video camera 102 and/or the digital video camera 106 and/or the sensor 114 and/or the sensor 116 and/or the processor 126 and/or processing logic 128, to retain a portion of a video/audio data stream at a relatively low resolution if a storage medium device that was not used for a specified previous retention of the portion provides an indication that it has less than a particular amount of available storage capacity.

Operation 1214 illustrates accepting input for the retention of the second portion of the data stream at the second resolution, wherein the retention of the second portion of the data stream at the second resolution is to be performed if a condition responsive to data received from a device other than a device to be used for the retention of the second portion of the data stream at the second resolution is met. Operation 1214 may include, for example, accepting input, via the digital video camera 102 and/or the digital video camera 106 and/or the sensor 114 and/or the sensor 116 and/or the processor 126 and/or processing logic 128, to retain a portion of a video/audio data stream at a relatively low resolution if a storage medium that is not to be used for retention of the portion at the low resolution provides an indication that information stored on it does not specify a requirement that the portion be retained at a high resolution, such as an indication from a storage medium not to be used for retention of the portion at a low resolution that a particular vehicle is of interest to user 110, when video/audio information regarding that vehicle is not included in the portion.

Operation 1216 shows accepting input for the retention of the second portion of the data stream at the second resolution, wherein the method includes a method implemented in a first device, and wherein the retention of the second portion of the data stream at the second resolution is to be performed if a condition responsive to data received from a second device is met. For example, operation 1216 may include accepting input, via the digital video camera 102 and/or the digital video camera 106 and/or the sensor 114 and/or the sensor 116 and/or the processor 126 and/or processing logic 128, to retain a portion of a video/audio data stream at a relatively low resolution, where the method related to data management is implemented in the processor 126 and/or the processing logic 128, if the processor 126 and/or the processing logic 128 receives from a back-up storage unit an indication that the storage capacity available in the buck-storage unit is less than a specified capacity.

FIG. 13 depicts a high-level logic flowchart of an operational process. The operational process shown may include one or more of the following operations: 1100 (described elsewhere herein), 1102 (described elsewhere herein), 1300, 1302, 1304, and/or 1306.

Operation 1300 depicts retaining the first portion of the data stream at the first resolution. Operation 1300 may include, for example, retaining a specified portion including the image of a particular person of interest at a relatively high resolution, using the digital video camera 102 and/or the digital video camera 106 and/or the sensor 114 and/or the sensor 116 and/or the processor 126 and/or processing logic 128.

Operation 1302 illustrates retaining the second portion of the data stream at the second resolution, if the condition is met. For example, operation 1302 may include retaining a specified portion of a video/audio data stream that does not include an image of a particular person of interest at a relatively low resolution, using the digital video camera 102 and/or the digital video camera 106 and/or the sensor 114 and/or the sensor 116 and/or the processor 126 and/or processing logic 128.

Operation 1304 shows accepting input for retention of the second portion of the data stream for retention at a third resolution, wherein the third resolution is less than the second resolution, and wherein the retention of the second portion of the data stream at the third resolution is to be performed if a further condition is met. Operation 1304 may include, for example, accepting input, via the digital video camera 102 and/or the digital video camera 106 and/or the sensor 114 and/or the sensor 116 and/or the processor 126 and/or processing logic 128, to retain a portion of a video/audio data stream at a lower resolution than a previously-used relatively low resolution if a further condition, such as the availability of less than a specified available storage capacity, or the passage of a specified period of time from a retention at the previously-used relatively low resolution, is met.

Operation 1306 shows retaining the second portion of the data stream at the third resolution, if the further condition is met. For example, operation 1304 may include retaining a portion of a video/audio data stream at a lower resolution than a previously-used relatively low resolution, using the digital video camera 102 and/or the digital video camera 106 and/or the sensor 114 and/or the sensor 116 and/or the processor 126 and/or processing logic 128.

Figure 14:
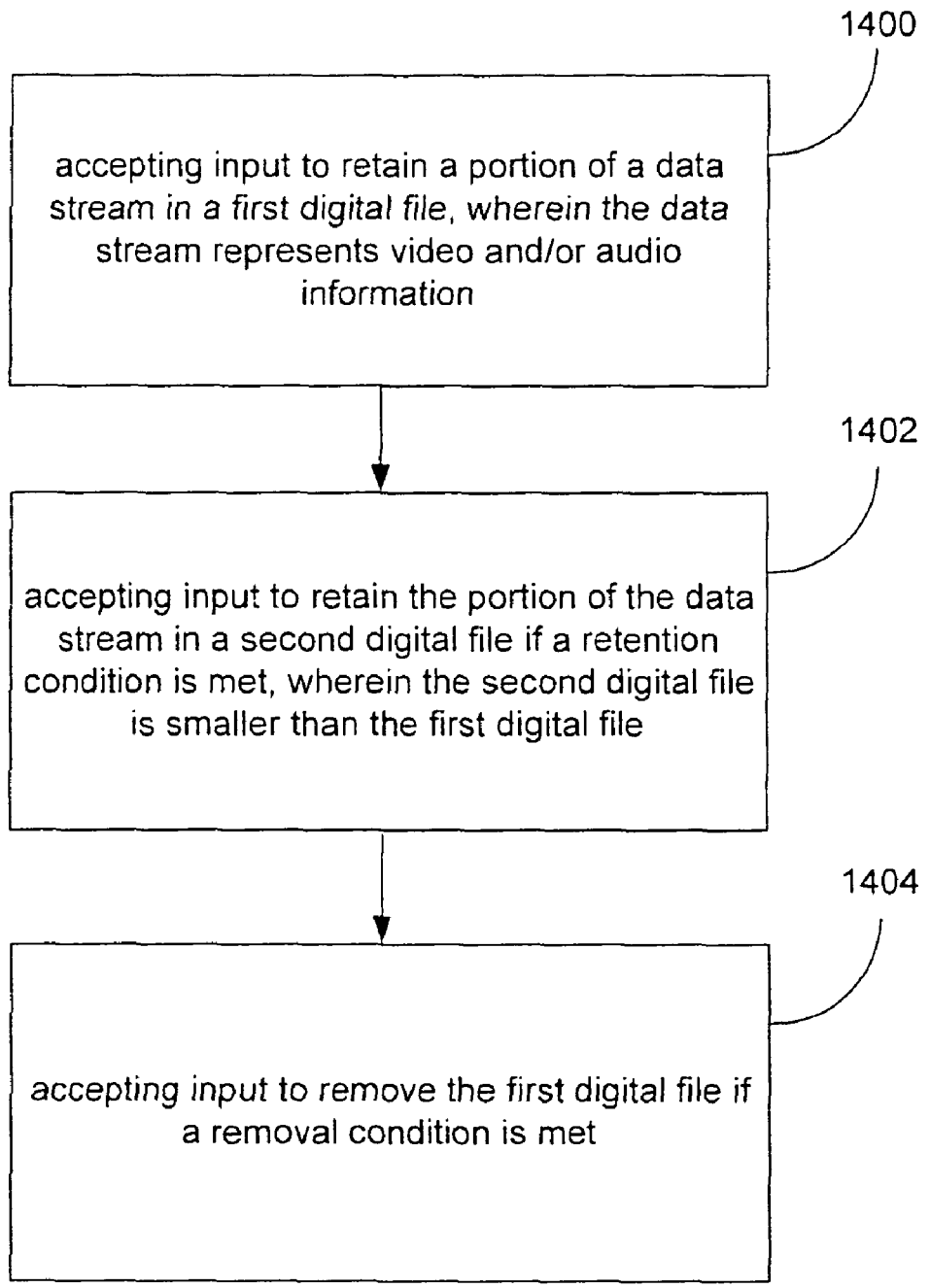
FIG. 14 shows a high-level logic flowchart of an operational process.

FIG. 14 shows a high-level logic flowchart of an operational process. The depicted operational process may include operations 1400, 1402, and/or 1404.

Operation 1400 depicts accepting input to retain a portion of a data stream in a first digital file, wherein the data stream represents video and/or audio information. Operation 1400 may include, for example, accepting input, via the digital video camera 102 and/or the digital video camera 106 and/or the sensor 114 and/or the sensor 116 and/or the processor 126 and/or processing logic 128, to retain a portion of a video/audio data stream in a first digital file stored on the digital video camera 102 and/or the digital video camera 106 and/or the sensor 114 and/or the sensor 116 and/or the processor 126 and/or processing logic 128 and/or on some storage unit operably coupled to one or more of those devices.

Operation 1402 illustrates accepting input to retain the portion of the data stream in a second digital file if a retention condition is met, wherein the second digital file is smaller than the first digital file. Continuing the example used in conjunction with the description of operation 1400 herein, operation 1402 may include accepting input, via the digital video camera 102 and/or the digital video camera 106 and/or the sensor 114 and/or the sensor 116 and/or the processor 126 and/or processing logic 128, to retain the portion of a video/audio data stream in a second digital file stored on the digital video camera 102 and/or the digital video camera 106 and/or the sensor 114 and/or the sensor 116 and/or the processor 126 and/or processing logic 128 and/or on some storage unit operably coupled to one or more of those devices, where the second digital file is smaller than a first digital file in which the portion is retained, if a retention condition is met, such as a condition including an indication of available storage capacity of less than a specified amount.

Operation 1404 shows accepting input to remove the first digital file if a removal condition is met. Continuing the example used in conjunction which the description of operation 1400 herein, operation 1404 may include accepting input, via the digital video camera 102 and/or the digital video camera 106 and/or the sensor 114 and/or the sensor 116 and/or the processor 126 and/or processing logic 128, to remove the first digital file if a removal condition is met, such as a confirmation form a user, e.g., user 130, or an automatic verification from the processor 126 and/or the processing logic 128, that the first digital file may be removed.

FIG. 15 depicts several alternative implementations of the high-level logic flowchart of FIG. 14. Operation 1402—accepting input to retain the portion of the data stream in a second digital file if a retention condition is met, wherein the second digital file is smaller than the first digital file—may include one or more of the following operations: 1500, 1502, 1504, 1506, 1508, 1510, 1512, 1514, 1516, and/or 1518.

Operation 1500 shows accepting input to retain the portion of the data stream in the second digital file using a resolution that results in the smaller second digital file. Operation 1500 may include, for example, accepting input, via the digital video camera 102 and/or the digital video camera 106 and/or the sensor 114 and/or the sensor 116 and/or the processor 126 and/or processing logic 128, to retain a portion of a video/audio data stream in a second digital file stored on the digital video camera 102 and/or the digital video camera 106 and/or the sensor 114 and/or the sensor 116 and/or the processor 126 and/or processing logic 128 and/or on some storage unit operably coupled to one or more of those devices, where the portion has also been stored in a first digital file at a resolution of 96 kB/sec, at a resolution such as 48 kB/sec that results in a second digital file that is smaller than the first digital file; here the second digital file would be approximately half the size of the first digital file.

Operation 1502 depicts accepting input to retain the portion of the data stream in the second digital file using a compression algorithm. Operation 1502 may include, for example, accepting input, via the digital video camera 102 and/or the digital video camera 106 and/or the sensor 114 and/or the sensor 116 and/or the processor 126 and/or processing logic 128, to retain a portion of a video/audio data stream in a second digital file stored on the digital video camera 102 and/or the digital video camera 106 and/or the sensor 114 and/or the sensor 116 and/or the processor 126 and/or processing logic 128 and/or on some storage unit operably coupled to one or more of those devices, using a compression algorithm to reduce the size of the file compared to a file created without the use of the compression algorithm. In this example, the compression algorithm may be stored and/or run using the digital video camera 102 and/or the digital video camera 106 and/or the sensor 114 and/or the sensor 116 and/or the processor 126 and/or processing logic 128 and/or on some computational unit operably coupled to one or more of those devices.

Operation 1504 illustrates accepting input to retain the portion of the data stream in the second digital file using data redaction. For example, operation 1504 may include accepting input, via the digital video camera 102 and/or the digital video camera 106 and/or the sensor 114 and/or the sensor 116 and/or the processor 126 and/or processing logic 128, to retain a portion of a video/audio data stream in a second digital file stored on the digital video camera 102 and/or the digital video camera 106 and/or the sensor 114 and/or the sensor 116 and/or the processor 126 and/or processing logic 128 and/or on some storage unit operably coupled to one or more of those devices, using data redaction to reduce the size of the file compared to a file created without the use of the data redaction, such as redaction of data representing the edges of a picture and/or the higher and lower frequencies of an audio aspect of the video/audio data stream. In this example, a program for data redaction may be stored and/or run using the digital video camera 102 and/or the digital video camera 106 and/or the sensor 114 and/or the sensor 116 and/or the processor 126 and/or processing logic 128 and/or on some computational unit operably coupled to one or more of those devices.

Operation 1506 illustrates accepting input to retain the portion of the data stream in the second digital file if the retention condition is met, wherein a second digital file resolution is less than a first digital file resolution. Operation 1506 may include, accepting input, via the digital video camera 102 and/or the digital video camera 106 and/or the sensor 114 and/or the sensor 116 and/or the processor 126 and/or processing logic 128, to retain a portion of a video/audio data stream in a second digital file stored on the digital video camera 102 and/or the digital video camera 106 and/or the sensor 114 and/or the sensor 116 and/or the processor 126 and/or processing logic 128 and/or on some storage unit operably coupled to one or more of those devices, where the portion has also been stored in a first digital file, such that the second digital file resolution, e.g., 12 kB/sec, is smaller than the first digital file resolution, e.g., 48 kB/sec.

Operation 1508 depicts accepting input to retain the portion of the data stream in the second digital file if a retention condition is met, wherein at least a portion of the data stream is retained at a second resolution that is less that a first resolution of the first digital file. For example, operation 1508 may include accepting input, via the digital video camera 102 and/or the digital video camera 106 and/or the sensor 114 and/or the sensor 116 and/or the processor 126 and/or processing logic 128, to retain a portion of a video/audio data stream in a second digital file stored on the digital video camera 102 and/or the digital video camera 106 and/or the sensor 114 and/or the sensor 116 and/or the processor 126 and/or processing logic 128 and/or on some storage unit operably coupled to one or more of those devices, where the portion has also been stored in a first digital file, such that the second digital file resolution of a part of the portion, e.g. the peripheral 50% of a video/imagery aspect of the portion, e.g., 100 kB/sec, is smaller than the first digital file resolution, e.g., 1 MB/sec. In this example, a program for file size reduction may be stored and/or run using the digital video camera 102 and/or the digital video camera 106 and/or the sensor 114 and/or the sensor 116 and/or the processor 126 and/or processing logic 128 and/or on some computational unit operably coupled to one or more of those devices.

Operation 1510 shows accepting input to reduce a first digital file resolution to a second digital file resolution and to retain the portion of the data stream at the second digital file resolution. Operation 1510 may include, for example, accepting input, via the digital video camera 102 and/or the digital video camera 106 and/or the sensor 114 and/or the sensor 116 and/or the processor 126 and/or processing logic 128, to retain a portion of a video/audio data stream in a second digital file stored on the digital video camera 102 and/or the digital video camera 106 and/or the sensor 114 and/or the sensor 116 and/or the processor 126 and/or processing logic 128 and/or on some storage unit operably coupled to one or more of those devices, where the portion has also been stored in a first digital file, such that the resolution of the first digital file, e.g., 1 MB/sec, is reduced to a smaller resolution for storage in the second digital file, e.g., 100 kB/sec. In this example, a program for file size reduction may be stored and/or run using the digital video camera 102 and/or the digital video camera 106 and/or the sensor 114 and/or the sensor 116 and/or the processor 126 and/or processing logic 128 and/or on some computational unit operably coupled to one or more of those devices.

Operation 1512 depicts accepting input to retain the portion of the data stream in the second digital file if a preselected time elapses from a retention of the portion of the data stream in the first digital file. For example, operation 1512 may include accepting input, via the digital video camera 102 and/or the digital video camera 106 and/or the sensor 114 and/or the sensor 116 and/or the processor 126 and/or processing logic 128, to retain a portion of a video/audio data stream in a second digital file stored on the digital video camera 102 and/or the digital video camera 106 and/or the sensor 114 and/or the sensor 116 and/or the processor 126 and/or processing logic 128 and/or on some storage unit operably coupled to one or more of those devices, where the portion has also been stored in a first digital file, a predetermined period of one week after the portion is retained in the first digital file.

Operation 1514 illustrates accepting input to retain the portion of the data stream in the second digital file if an available storage space is less than a preselected threshold. Operation 1514 may include, for example, accepting input, via the digital video camera 102 and/or the digital video camera 106 and/or the sensor 114 and/or the sensor 116 and/or the processor 126 and/or processing logic 128, to retain a portion of a video/audio data stream in a second digital file stored on the digital video camera 102 and/or the digital video camera 106 and/or the sensor 114 and/or the sensor 116 and/or the processor 126 and/or processing logic 128 and/or on some storage unit operably coupled to one or more of those devices, where the portion has also been stored in a first digital file, if an available storage capacity is less than a preselected threshold of 1 GB.

Operation 1516 depicts accepting input to retain the portion of the data stream in the second digital file in response to at least one temporal parameter, an absence of a predetermined amount of available storage space, a user-established parameter, and/or a parameter established by a storage management algorithm. For example, operation 1514 may include, accepting input, via the digital video camera 102 and/or the digital video camera 106 and/or the sensor 114 and/or the sensor 116 and/or the processor 126 and/or processing logic 128, to retain a portion of a video/audio data stream in a second digital file stored on the digital video camera 102 and/or the digital video camera 106 and/or the sensor 114 and/or the sensor 116 and/or the processor 126 and/or processing logic 128 and/or on some storage unit operably coupled to one or more of those devices, where the portion has also been stored in a first digital file, if a predetermined amount of storage space, e.g., 3.0 GB, is unavailable, and/or if a user, e.g., user 130, has set a parameter that the portion is to be stored in the second digital file two weeks after the portion is retained in the first digital file and two weeks have passed from that first digital file storage, and/or a storage management algorithm indicates that certain little-used files must be replaced with smaller files and the first digital file qualifies as a little-used file.

Operation 1518 shows accepting input to retain the portion of the data stream in the second digital file if a condition responsive to an examination of at least one other retained set of video and/or audio data is met. For example, operation 1518 may include accepting input, via the digital video camera 102 and/or the digital video camera 106 and/or the sensor 114 and/or the sensor 116 and/or the processor 126 and/or processing logic 128, to retain a portion of a video/audio data stream in a second digital file stored on the digital video camera 102 and/or the digital video camera 106 and/or the sensor 114 and/or the sensor 116 and/or the processor 126 and/or processing logic 128 and/or on some storage unit operably coupled to one or more of those devices, where the portion has also been stored in a first digital file, when an examination of another set of retained data, such as a table showing interest in the video/imagery/audio subject matter of the portion of the video/audio data stream, indicates that interest in that subject matter is below that requiring retention at the resolution of the first digital file.

Figure 16:
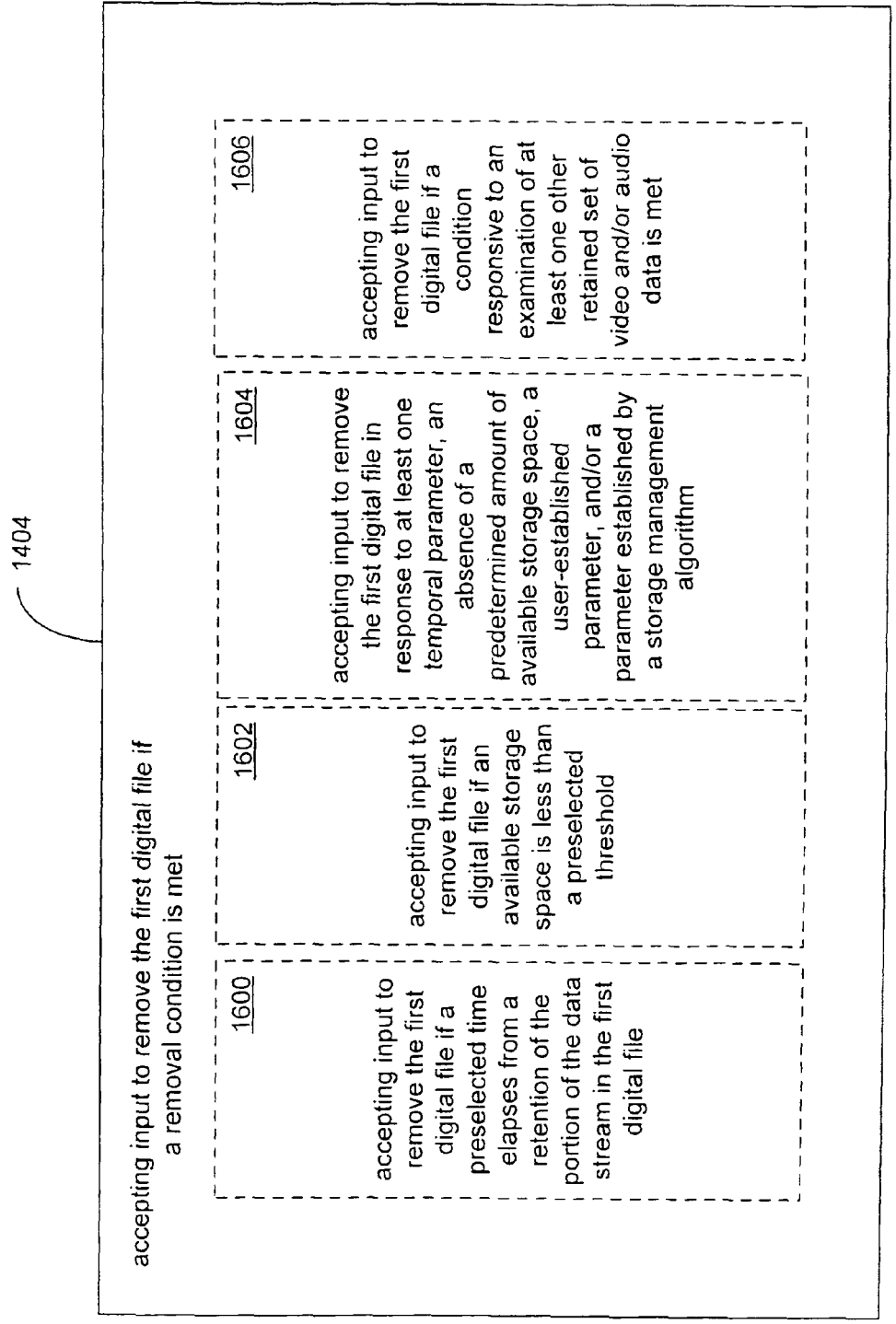
FIG. 16 shows several alternative implementations of the high-level logic flowchart of FIG. 14.

FIG. 16 shows several alternative implementations of the high-level logic flowchart of FIG. 14. Operation 1404—accepting input to remove the first digital file if a removal condition is met—may include one or more of the following operations: 1600, 1602, 1604, and/or 1606.

Operation 1600 shows accepting input to remove the first digital file if a preselected time elapses from a retention of the portion of the data stream in the first digital file. For example, operation 1600 may include accepting input, via the digital video camera 102 and/or the digital video camera 106 and/or the sensor 114 and/or the sensor 116 and/or the processor 126 and/or processing logic 128, to remove a first digital file including a retained portion of a video/audio stored on the digital video camera 102 and/or the digital video camera 106 and/or the sensor 114 and/or the sensor 116 and/or the processor 126 and/or processing logic 128 and/or on some storage unit operably coupled to one or more of those devices, a predetermined period of 30 days after a retention of the first digital file.

Operation 1602 depicts accepting input to remove the first digital file if an available storage space is less than a preselected threshold. Operation 1602 may include, for example, accepting input, via the digital video camera 102 and/or the digital video camera 106 and/or the sensor 114 and/or the sensor 116 and/or the processor 126 and/or processing logic 128, to remove a first digital file including a retained portion of a video/audio stored on the digital video camera 102 and/or the digital video camera 106 and/or the sensor 114 and/or the sensor 116 and/or the processor 126 and/or processing logic 128 and/or on some storage unit operably coupled to one or more of those devices, if an available storage space is less than a preselected threshold of 2.5 GB.

Operation 1604 illustrates accepting input to remove the first digital file in response to at least one temporal parameter, an absence of a predetermined amount of available storage space, a user-established parameter, and/or a parameter established by a storage management algorithm. Operation 1604 may include, for example, accepting input, via the digital video camera 102 and/or the digital video camera 106 and/or the sensor 114 and/or the sensor 116 and/or the processor 126 and/or processing logic 128, to remove a first digital file including a retained portion of a video/audio stored on the digital video camera 102 and/or the digital video camera 106 and/or the sensor 114 and/or the sensor 116 and/or the processor 126 and/or processing logic 128 and/or on some storage unit operably coupled to one or more of those devices, if a predetermined amount of storage space of, e.g., 5.0 GB, is not available, and/or if a user such as user 130 has set a parameter that the first digital file is to be removed if two weeks from the retention of the portion in the first digital file has passed and a retention at a lesser resolution in a second digital file has been confirmed, and/or a storage management algorithm indicates that files above a particular resolution that have not been accessed for a month must be removed after being replaced by a smaller second digital file and the first digital file qualifies for removal.

Operation 1606 shows accepting input to remove the first digital file if a condition responsive to an examination of at least one other retained set of video and/or audio data is met. For example, operation 1606 may include accepting input, via the digital video camera 102 and/or the digital video camera 106 and/or the sensor 114 and/or the sensor 116 and/or the processor 126 and/or processing logic 128, to remove a first digital file including a retained portion of a video/audio stored on the digital video camera 102 and/or the digital video camera 106 and/or the sensor 114 and/or the sensor 116 and/or the processor 126 and/or processing logic 128 and/or on some storage unit operably coupled to one or more of those devices, when an examination of another set of retained data, such as an off-line library of archived video/imagery/audio records of persons and vehicles, indicates that an archived file at the size of the first digital file exists and is accessible to the user, such as user 130, if such an archived file is required.

FIG. 17 shows a high-level logic flowchart of an operational process. The depicted operational process may include one or more of the following operations: 1700, 1702, 1704, 1706, 1708, 1710, and/or 1712.

Operation 1700 depicts accepting input to retain the portion of the data stream in a third digital file if a further retention condition is met, wherein the third digital file is smaller than the second digital file. Operation 1700 may include, for example, accepting input, via the digital video camera 102 and/or the digital video camera 106 and/or the sensor 114 and/or the sensor 116 and/or the processor 126 and/or processing logic 128, to retain a portion of a video/audio data stream in a third digital file stored on the digital video camera 102 and/or the digital video camera 106 and/or the sensor 114 and/or the sensor 116 and/or the processor 126 and/or processing logic 128 and/or on some storage unit operably coupled to one or more of those devices, where the portion has been stored in a second digital file and the third digital file is smaller than the second digital file, if a further retention condition is met, such as the passage of a predetermined period of time from the retention of the portion in the second digital file with no accesses of the second digital file.

Operation 1702 shows accepting input to remove the second digital file if a further removal condition is met. Operation 1702 may include, for example, accepting input, via the digital video camera 102 and/or the digital video camera 106 and/or the sensor 114 and/or the sensor 116 and/or the processor 126 and/or processing logic 128, to remove a second digital file including a retained portion of a video/audio stored on the digital video camera 102 and/or the digital video camera 106 and/or the sensor 114 and/or the sensor 116 and/or the processor 126 and/or processing logic 128 and/or on some storage unit operably coupled to one or more of those devices, if a further removal condition is met, such as a verification that a third digital file including at least a portion of the data included in the second digital file has been retained.

Operation 1704 depicts retaining the portion of a data stream in the first digital file. For example, operation 1704 may include retaining a portion of a video/audio data stream in a first digital file stored on the digital video camera 102 and/or the digital video camera 106 and/or the sensor 114 and/or the sensor 116 and/or the processor 126 and/or processing logic 128 and/or on some storage unit operably coupled to one or more of those devices.

Operation 1706 shows retaining the portion of the data stream in the second digital file if the retention condition is met. Operation 1706 may include, for example, retaining a portion of a video/audio data stream in a second digital file stored on the digital video camera 102 and/or the digital video camera 106 and/or the sensor 114 and/or the sensor 116 and/or the processor 126 and/or processing logic 128 and/or on some storage unit operably coupled to one or more of those devices, if a retention condition is met, such as a predetermined temporal distance range including a distance in the video/audio data stream between the portion and another portion designated for high-resolution retention.

Operation 1708 shows removing the first digital file if the removal condition is met. For example, operation 1708 may include removing a first digital file including a portion of a video/audio data stream and stored on the digital video camera 102 and/or the digital video camera 106 and/or the sensor 114 and/or the sensor 116 and/or the processor 126 and/or processing logic 128 and/or on some storage unit operably coupled to one or more of those devices if a removal condition is met, such as an absence of a predetermined amount of storage space, such as 3.0 GB.

Operation 1710 illustrates retaining the portion of the data stream in a third digital file if the further retention condition is met. For example, operation 1710 may include retaining a portion of a video/audio data stream in a second digital file stored on the digital video camera 102 and/or the digital video camera 106 and/or the sensor 114 and/or the sensor 116 and/or the processor 126 and/or processing logic 128 and/or on some storage unit operably coupled to one or more of those devices, if a further retention condition is met, such as the passage of a preselected period of time between the retention of the portion in second digital file larger than the third digital file without any accesses by a user such as user 130.

Operation 1712 illustrates removing the second digital file if the further removal condition is met. Operation 1712 may include, for example removing a second digital file including a portion of a video/audio data stream and stored on the digital video camera 102 and/or the digital video camera 106 and/or the sensor 114 and/or the sensor 116 and/or the processor 126 and/or processing logic 128 and/or on some storage unit operably coupled to one or more of those devices if a removal condition is met, such as an absence of a predetermined amount of storage space, such as 3.0 GB.

Those having skill in the art will recognize that the state of the art has progressed to the point where there is little distinction left between hardware and software implementations of aspects of systems; the use of hardware or software is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies equally regardless of the particular type of signal bearing media used to actually carry out the distribution. Examples of a signal bearing media include, but are not limited to, the following: recordable type media such as floppy disks, hard disk drives, CD ROMs, digital tape, and computer memory; and transmission type media such as digital and analog communication links using TDM or IP based communication links (e.g., packet links).

In a general sense, those skilled in the art will recognize that the various aspects described herein which can be implemented, individually and/or collectively, by a wide range of hardware, software, firmware, or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of random access memory), and/or electrical circuitry forming a communications device (e.g., a modem, communications switch, or optical-electrical equipment).

Those skilled in the art will recognize that it is common within the art to describe devices and/or processes in the fashion set forth herein, and thereafter use engineering practices to integrate such described devices and/or processes into image processing systems. That is, at least a portion of the devices and/or processes described herein can be integrated into an image processing system via a reasonable amount of experimentation. Those having skill in the art will recognize that a typical image processing system generally includes one or more of a system unit housing, a video display device, a memory such as volatile and non-volatile memory, processors such as microprocessors and digital signal processors, computational entities such as operating systems, drivers, and applications programs, one or more interaction devices, such as a touch pad or screen, control systems including feedback loops and control motors (e.g., feedback for sensing lens position and/or velocity; control motors for moving/distorting lenses to give desired focuses. A typical image processing system may be implemented utilizing any suitable commercially available components, such as those typically found in digital still systems and/or digital motion systems.

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

All of the above U.S. patents, U.S. patent application publications, U.S. patent applications, foreign patents, foreign patent applications and non-patent publications referred to in this specification and/or listed in any Application Data Sheet, are incorporated herein by reference, in their entireties.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of this subject matter described herein. Furthermore, it is to be understood that the invention is defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B. and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.).

We claim:

1. A program product related to data management, the program product comprising:
    a non-transitory computer readable medium bearing:
        one or more instructions for accepting input for designation of a first portion of a data stream for retention at a first resolution, the input including designation of at least a first-portion temporal beginning designator and a first-portion temporal ending designator in the data stream, wherein the data stream represents video and/or audio information including video and/or audio information of an aspect of interest, and wherein the data stream includes at least two sequential frames of video and/or audio information; and
        one or more instructions for accepting input for designation of a second portion of the data stream for retention at a second resolution, wherein the second resolution is less than the first resolution, and wherein the retention of the second portion of the data stream at the second resolution is to be performed if a condition is met, including the condition that the aspect of interest is one or more of silent and/or missing.

2. The program product of claim 1, wherein the one or more instructions for accepting input for designation of a first portion of a data stream for retention at a first resolution, the input including designation of at least a first-portion temporal beginning designator and a first-portion temporal ending designator in the data stream, wherein the data stream represents video and/or audio information including video and/or audio inforamtion of an aspect of interest, and wherein the data stream includes at least two sequential frames of video and/or audio information further comprise:
    one or more instructions for accepting input for designation of a first-portion temporal reference designator in the data stream, wherein a first-portion temporal referenced beginning designator in the data stream for the retention of the first portion of the data stream at the first resolution is at a first pre-specified beginning time period from the first-portion temporal reference designator.

3. The program product of claim 1, wherein the one or more instructions for accepting input for designation of a first portion of a data stream for retention at a first resolution, the input including designation of at least a first-portion temporal beginning designator and a first-portion temporal ending designator in the data stream, wherein the data stream represents video and/or audio information including video and/or audio information of an aspect of interest, and wherein the data stream includes at least two sequential frames of video and/or audio information further comprise:

one or more instructions for accepting input for designation of a first-portion temporal reference designator in the data stream, wherein a first-portion temporal referenced ending designator in the data stream for the retention of the first portion of the data stream at the first resolution is at a first pre-specified ending time period from the first-portion temporal reference designator.

4. The program product of claim 1, wherein the one or more instructions for accepting input for designation of a first portion of a data stream for retention at a first resolution, the input including designation of at least a first-portion temporal beginning designator and a first-portion temporal ending designator in the data stream, wherein the data stream represents video and/or audio information including video and/or audio information of an aspect of interest, and wherein the data stream includes at least two sequential frames of video and/or audio information further comprise:

one or more instructions for accepting input to confirm an aspect of the designation of the first portion of the data stream for the retention at the first resolution.

5. The program product of claim 1, wherein the one or more instructions for accepting input for designation of a first portion of a data stream for retention at a first resolution, the input including designation of at least a first-portion temporal beginning designator and a first-portion temporal ending designator in the data stream, wherein the data stream represents video and/or audio information including video and/or audio information of an aspect of interest, and wherein the data stream includes at least two sequential frames of video and/or audio information further comprise:

one or more instructions for accepting input for designation of a value for the first resolution.

6. The program product of claim 1, wherein the one or more instructions for accepting input for designation of a first portion of a data stream for retention at a first resolution, the input including designation of at least a first-portion temporal beginning designator and a first-portion temporal ending designator in the data stream, wherein the data stream represents video and/or audio information further comprise:

one or more instructions for accepting input for designation of audio data for inclusion in the first portion of the data stream.

7. The program product of claim 1, wherein the one or more instructions for accepting input for designation of a first portion of a data stream for retention at a first resolution, the input including designation of at least a first-portion temporal beginning designator and a first-portion temporal ending designator in the data stream, wherein the data stream represents video and/or audio information including video and/or audio information of an aspect of interest, and wherein the data stream incldues at least two sequential frames of video and/or audio information further comprise:

one or more instructions for accepting input for designation of video data for inclusion in the first portion of the data stream.

8. The program product of claim 1, wherein the one or more instructions for accepting input for designation of a first portion of a data stream for retention at a first resolution, the input including designation of at least a first-portion temporal beginning designator and a first-portion temporal ending designator in the data stream, wherein the data stream represents video and/or audio information including video and/or audio information of an aspect of interest, and wherein the data stream includes at least two sequential frames of video and/or audio information further comprise:

one or more instructions for accepting input for designation of a portion of a live and/or a substantially live data stream for the retention at the first resolution.

9. The program product of claim 1, wherein the one or more instructions for accepting input for designation of a first portion of a data stream for retention at a first resolution, the input including designation of at least a first-portion temporal beginning designator and a first-portion temporal ending designator in the data stream, wherein the data stream represents video and/or audio information including video and/or audio information of an aspect of interest, and wherein the data stream includes at least two sequential frames of video and/or audio information further comprise:

one or more instructions for accepting input for designation of a portion of a retained data stream for the retention at the first resolution.

10. The program product of claim 1, wherein the one or more instructions for accepting input for designation of a first portion of a data stream for retention at a first resolution, the input including designation of at least a first-portion temporal beginning designator and a first-portion temporal ending designator in the data stream, wherein the data stream represents video and/or audio information including video and/or audio information of an aspect of interest, and wherein the data stream includes at least two sequential frames of video and/or audio information further comprise:

one or more instructions for accepting sonic input.

11. The program product of claim 1, wherein the one or more instructions for accepting input for designation of a first portion of a data stream for retention at a first resolution, the input including designation of at least a first-portion temporal beginning designator and a first-portion temporal ending designator in the data stream, wherein the data stream represents video and/or audio information including video and/or audio information of an aspect of interest, and wherein the data stream includes at least two sequential frames of video and/or audio information further comprise:

one or more instructions for accepting visual input.

12. The program product of claim 11, wherein the one or more instructions for accepting visual input further comprise:

one or more instructions for accepting visual input, wherein the visual input includes data representing stored visual information.

13. The program product of claim 1, wherein the one or more instructions for accepting input for designation of a first portion of a data stream for retention at a first resolution, the input including designation of at least a first-portion temporal beginning designator and a first-portion temporal ending designator in the data stream, wherein the data stream represents video and/or audio information including video and/or audio information of an aspect of interest, and wherein the data stream includes at least two sequential frames of video and/or audio information further comprise:

one or more instructions for accepting input for designation of a first-portion frequency range characteristic.

14. The program product of claim 1, wherein the one or more instructions for accepting input for designation of a first portion of a data stream for retention at a first resolution, the input including designation of at least a first-portion temporal beginning designator and a first-portion temporal ending designator in the data stream, wherein the data stream represents video and/or audio information including video and/or audio information of an aspect of interest, and wherein the data stream includes at least two sequential frames of video and/or audio information further comprise:

one or more instructions for accepting input for designation of a first-portion frequency distribution characteristic.

15. The program product of claim 1, wherein the one or more instructions for accepting input for designation of a second portion of the data stream for retention at a second resolution, wherein the second resolution is less than the first resolution, and wherein the retention of the second portion of the data stream at the second resolution is to be performed if a condition is met, including the condition that the aspect of interest is one or more of silent and/or missing further comprise:

one or more instructions for accepting input for designation of a second-portion temporal beginning designator in the data stream for the retention of the second portion of the data stream at the second resolution.

16. The program product of claim 1, wherein the one or more instructions for accepting input for designation of a second portion of the data stream for retention at a second resolution, wherein the second resolution is less than the first resolution, and wherein the retention of the second portion of the data stream at the second resolution is to be performed if a condition is met, including the condition that the aspect of interest is one or more of silent and/or missing further comprise:

one or more instructions for accepting input for designation of a second-portion temporal ending designator in the data stream for the retention of the second portion of the data stream at the second resolution.

17. The program product of claim 1, wherein the one or more instructions for accepting input for designation of a second portion of the data stream for retention at a second resolution, wherein the second resolution is less than the first resolution, and wherein the retention of the second portion of the data stream at the second resolution is to be performed if a condition is met, including the condition that the aspect of interest is one or more of silent and/or missing further comprise:

one or more instructions for accepting input for designation of a second-portion temporal reference designator in the data stream, wherein a second-portion temporal referenced beginning designator in the data stream for the retention of the second portion of the data stream at the second resolution is at a second pre-specified beginning time period from the second-portion temporal reference designator.

18. The program product of claim 1, wherein the one or more instructions for accepting input for designation of a second portion of the data stream for retention at a second resolution, wherein the second resolution is less than the first resolution, and wherein the retention of the second portion of the data stream at the second resolution is to be performed if a condition is met, including the condition that the aspect of interest is one or more of silent and/or missing further comprise:

one or more instructions for accepting input for designation of a second-portion temporal reference designator in the data stream, wherein a second-portion temporal referenced ending designator in the data stream for the retention of the second portion of the data stream at the second resolution is at a second pre-specified ending time period from the second-portion temporal reference designator.

19. The program product of claim 1, wherein the one or more instructions for accepting input for designation of a second portion of the data stream for retention at a second resolution, wherein the second resolution is less than the first resolution, and wherein the retention of the second portion of the data stream at the second resolution is to be performed if a condition is met, including the condition that the aspect of interest is one or more of silent and/or missing further comprise:

one or more instructions for accepting input to confirm an aspect of the designation of the second portion of the data stream for the retention at the second resolution.

20. The program product of claim 1, wherein the one or more instructions for accepting input for designation of a second portion of the data stream for retention at a second resolution, wherein the second resolution is less than the first resolution, and wherein the retention of the second portion of the data stream at the second resolution is to be performed if a condition is met, including the condition that the aspect of interest is one or more of silent and/or missing further comprise:

one or more instructions for accepting input for designation of a value for the second resolution.

21. The program product of claim 1, wherein the one or more instructions for accepting input for designation of a second portion of the data stream for retention at a second resolution, wherein the second resolution is less than the first resolution, and wherein the retention of the second portion of the data stream at the second resolution is to be performed if a condition is met, including the condition that the aspect of interest is one or more of silent and/or missing further comprise:

one or more instructions for accepting input for designation of audio data for inclusion in the second portion of the data stream.

22. The program product of claim 1, wherein the one or more instructions for accepting input for designation of a second portion of the data stream for retention at a second resolution, wherein the second resolution is less than the first resolution, and wherein the retention of the second portion of the data stream at the second resolution is to be performed if a condition is met, including the condition that the aspect of interest is one or more of silent and/or missing further comprise:

one or more instructions for accepting input for designation of video data for inclusion in the second portion of the data stream.

23. The program product of claim 1, wherein the one or more instructions for accepting input for designation of a second portion of the data stream for retention at a second resolution, wherein the second resolution is less than the first resolution, and wherein the retention of the second portion of the data stream at the second resolution is to be performed if a condition is met, including the condition that the aspect of interest is one or more of silent and/or missing further comprise:

one or more instructions for accepting input for designation of a portion of a live and/or a substantially live data stream for the retention at the second resolution.

24. The program product of claim 1, wherein the one or more instructions for accepting input for designation of a second portion of the data stream for retention at a second resolution, wherein the second resolution is less than the first resolution, and wherein the retention of the second portion of the data stream at the second resolution is to be performed if a condition is met, including the condition that the aspect of interest is one or more of silent and/or missing further comprise:
one or more instructions for accepting input for designation of a portion of a retained data stream for the retention at the second resolution.

25. The program product of claim 1, wherein the one or more instructions for accepting input for designation of a second portion of the data stream for retention at a second resolution, wherein the second resolution is less than the first resolution, and wherein the retention of the second portion of the data stream at the second resolution is to be performed if a condition is met, including the condition that the aspect of interest is one or more of silent and/or missing further comprise:
one or more instructions for accepting sonic input.

26. The program product of claim 1, wherein the one or more instructions for accepting input for designation of a second portion of the data stream for retention at a second resolution, wherein the second resolution is less than the first resolution, and wherein the retention of the second portion of the data stream at the second resolution is to be performed if a condition is met, including the condition that the aspect of interest is one or more of silent and/or missing further comprise:
one or more instructions for accepting visual input.

27. The program product of claim 26, wherein the one or more instructions for accepting visual input further comprise:
one or more instructions for accepting visual input, wherein the visual input includes data representing stored visual information.

28. The program product of claim 1, wherein the one or more instructions for accepting input for designation of a second portion of the data stream for retention at a second resolution, wherein the second resolution is less than the first resolution, and wherein the retention of the second portion of the data stream at the second resolution is to be performed if a condition is met, including the condition that the aspect of interest is one or more of silent and/or missing further comprise:
one or more instructions for accepting input for designation of a second-portion frequency range characteristic.

29. The program product of claim 1, wherein the one or more instructions for accepting input for designation of a second portion of the data stream for retention at a second resolution, wherein the second resolution is less than the first resolution, and wherein the retention of the second portion of the data stream at the second resolution is to be performed if a condition is met, including the condition that the aspect of interest is one or more of silent and/or missing further comprise:
one or more instructions for accepting input for designation of a second-portion frequency distribution characteristic.

30. The program product of claim 1, wherein the one or more instructions for accepting input for designation of a second portion of the data stream for retention at a second resolution, wherein the second resolution is less than the first resolution, and wherein the retention of the second portion of the data stream at the second resolution is to be performed if a condition is met, including the condition that the aspect of interest is one or more of silent and/or missing further comprise:
one or more instructions for accepting input for the designation of the second portion of the data stream for the retention at the second resolution, wherein the second resolution is less than the first resolution, and wherein the retention of the second portion of the data stream at the second resolution is to be performed if an available storage space is less than a preselected amount.

31. The program product of claim 1, wherein the one or more instructions accepting input for designation of a first portion of a data stream for retention at a first resolution, the input including designation of at least a first-portion temporal beginning designator and a first-portion temproal ending designator in the data stream, wherein the data stream represents video and/or audio information including video and/or audio information of an aspect of interest, and wherein the data stream incldues at least two sequential frames of video and/or audio inforamtion further comprise:
accepting input for designation of a portion of a data stream, the portion of a data stream including a voice of a particular person of interest, for retention at a first resolution.

32. The program product of claim 31, wherein the one or more instruction for accepting input for designation of a second portion of the data stream for retention at a second resolution, wherein the second resolution is less than the first resolution, and wherein the retention of the second portion of the data stream at the second resolution is to be performed if a condition is met, including the condition that the aspect of interest is one or more of silent and/or missing includes:
accepting input for designation of a portion of the data stream, the portion of the data stream lacking the voice of the particular person of interest, for retention at a second resolution, wherein the second resolution is less than the first resolution, and wherein the retention of the second portion of the data stream at the second resolution is to be performed if there is insufficient capacity for retention of the second portion of the data stream at the first resolution.

33. The program product of claim 1, wherein the one or more instructions for accepting input for designation of a first portion of a data stream for retention at a first resolution, the input including designation of at least a first-portion temproal beginning designator and a first-portion temporal ending designator in the data stream, wherein the data stream represents video and/or audio information including video and/or audio information of an aspect of interest, and wherein the data stream includes at least two sequential frames of video and/or audio information further comprise:
accepting input for designation of a first-portion temporal reference designator in the data stream, the data stream having two or more frames of video data, wherein a first-portion temporal referenced beginning designator in the data stream for the retention of the first portion of the data stream at the first resolution is at a first pre-specified beginning time period from the first-portion temporal reference designator, the first-portion temporal reference designator being an indication of the end of a first relative silence in the data stream.

34. A method comprising:
at least one of transmitting or receiving, by a camera device:
one or more instructions for accepting input for designation of a first portion of a data stream for retention at a first resolution, the input including designation of at least a first-portion temporal beginning designator and a first-portion temporal ending designator in the data stream, wherein the data stream represents video and/or audio information including video and/or audio information of an aspect of interest, and wherein the data stream includes at least two sequential frames of video and/or audio information; and one or more instructions for accepting input for designation of a second portion of the data stream for retention at a second resolution, wherein the second resolution is less than the first resolution, and wherein the retention of the second portion of the data stream at the second resolution is to be performed if a condition is met, including the condition that the aspect of interest is one or more of silent and/or missing.

35. A system comprising:

processor and/or processing logic structured to at least partially provide for acceptance of input for designation of a first portion of a data stream for retention at a first resolution, the input including designation of at least a first-portion temporal beginning designator and a first-portion temporal ending designator in the data stream, wherein the data stream represents video and/or audio information including video and/or audio information of an aspect of interest, and wherein the data stream includes at least two sequential frames of video and/or audio information; and processor and/or processing logic structured to at least partially provide for acceptance of input for designation of a second portion of the data stream for retention at a second resolution, wherein the second resolution is less than the first resolution, and wherein the retention of the second portion of the data stream at the second resolution is to be performed if a condition is met, including the condition that the aspect of interest is one or more of silent and/or missing.

\* \* \* \* \*